United States Patent [19]

Ployette

[11] Patent Number: 4,799,186

[45] Date of Patent: Jan. 17, 1989

[54] ELECTRONIC CIRCUIT CONSTITUTING AN IMPROVED HIGH-SPEED STABLE MEMORY WITH MEMORY ZONES PROTECT FROM OVERLAP

[75] Inventor: Florimond E. Ployette, Rennes, France

[73] Assignee: Inria Institut National de Recherche en Informatique et en Automatique, Le Chesnay, France

[21] Appl. No.: 941,212

[22] Filed: Dec. 12, 1986

[30] Foreign Application Priority Data

Dec. 12, 1985 [FR] France .................. 85 18437

[51] Int. Cl.[4] .......................................... G06F 12/00
[52] U.S. Cl. ....................................................... 364/900
[58] Field of Search ... 364/200 MS File, 900 MS File

[56] References Cited

U.S. PATENT DOCUMENTS 4,575,792 3/1986 Keeley ................. 364/200

FOREIGN PATENT DOCUMENTS 2553541 4/1985 France .

OTHER PUBLICATIONS

Communications of the ACM, "Storage Organization in Programming systems", Jane G. Jodeit, vol. 11, No. 11, Nov. 1968, pp. 741-746.

Primary Examiner—Raulfe B. Zache
Attorney, Agent, or Firm—Foley & Lardner, Schwartz, Jeffery, Schwaab, Mack, Blumenthal & Evans

[57] ABSTRACT

The stable memory (2) includes an interface (30) for communication with an allocated processor (1). It includes two memory banks (51, 52) for containing the same information at each address. The interface (b 30) interchanges addresses and commands with the memory banks via an access logic conroller or filter (20). Data interchanges pass via a switching and comparator member (40). The information contained in the memory banks (51, 52) is structured in the form of objects which are rendered indivisible by use of a chaining vector which is established and verified by the logic controller (20).

22 Claims, 16 Drawing Sheets

ELECTRONIC CIRCUIT CONSTITUTING AN IMPROVED HIGH-SPEED STABLE MEMORY WITH MEMORY ZONES PROTECT FROM OVERLAP

The invention relates to electronic memories.

BACKGROUND OF THE INVENTION

The French patent application No. 83 16488 published under the number 2 553 541 in the name of INRIA describes an electronic circuit constituting a high-speed stable memory, and comprising: address, data input/output, and read and write instruction lines or interfaces suitable for being connected to an external processor; first and second independent non-volatile read/write memory assemblies having address inputs, read/write control inputs, and data inputs/outputs; and access control means connected firstly to the address interfaces and to the read/write control interfaces, and secondly to the address inputs and to the read/write control inputs of both memory assemblies in such a manner as to authorize access only to a designated portion in each of the two memory assemblies, on each occasion that a designated read or write operation is to take place, with said authorization being destroyed after said memory portion has been addressed.

Although this prior art high-speed stable memory has given satisfaction, in particular in a distributed computing system for running a public bidding or auction system, it nevertheless suffers from certain drawbacks.

One of these drawbacks lies in the fact that each elementary protected zone in the memory as seen from the processor remains closely bound to the hardware structure of the memory, i.e. to its component words and bits.

Another drawback, partially related to the first drawback, lies in that some of the verifications necessary for ensuring memory stability are performed by software, and are, in some respects, performed by the processor using said memory.

In addition, restarting after a non-rectifiable anomaly in the memory was left entirely under the control of the processor using the memory.

The present invention seeks to improve the prior art high-speed stable memory in order to remedy the above drawbacks.

It is specified as this point that the present invention is physically embodied in the form of a module or card having stable memory and including memory components per se together with other components. The entire assembly is referred to herein as "stable memory".

A first aim of the present invention is to ensure that the "atomicity" of the operations performed by the stable memory no longer relies to any great extent on the processor using the memory, and that this is true, in particular, for the mechanisms concerned with mutual exclusions, with copying, and with creating zones in the memory in the manner described below in greater detail.

The terms "atomicity" and "atomic" are used in this specification, as in the above-mentioned prior specification, to specify that once information has been presented for writing, it is certain that the information is either correctly written in full, or else that it is not written at all.

In particular, in the present invention steps are taken to ensure that two protected memory zones cannot overlap, which could happen if the processor using the memory were allowed to define the memory zones it uses on the basis of memory words which are themselves intrinsically protected by the stable memory.

Another aim of the invention is for the size of the protected memory zones to be independent from the hardware structure of the memory; an "object" is thus defined which is constituted by a subset of the words in the memory, regardless of whether said words are contiguous or not. An object may, in turn, be decomposed into sub-objects, which are groups of memory zones that need not necessarily be contiguous but which must necessary lie within the portion of the memory assigned to the object to which they belong.

Yet another aim of the present invention is to provide a stable memory of higher speed than before.

SUMMARY OF THE INVENTION

To this end the invention is based on a high-speed stable memory, and comprising: address, data input/output, and read and write instruction interfaces suitable for being directly connected to an external processor; first and second independent non-volatile read/write memory assemblies having address inputs, read/write control inputs, and data inputs/outputs; and access control means connected firstly to the address interfaces and to the read/write control interfaces, and secondly to the address inputs and to the read/write control inputs of both memory assemblies in such a manner as to authorize access only to a designated portion in each of the two memory assemblies, on each occasion that a designated read or write operation is to take place, with said authorization being destroyed after said memory portion has been addressed.

According to the invention the access control means comprise a logic controller associated with a first auxiliary non-volatile memory for containing partitioning information suitable for splitting each of the memory assemblies identically into at least one level of disjoint subassemblies called "objects"; and the logic controller splits each memory access request from the external processor into one or more active states for memory access in each of which it verifies that the sequence of addresses applied to the memory assemblies covers a complete subassembly (or object) as defined by the partition information, with any anomaly causing the logic controller to take up an error state.

Most advantageously, the memory includes a switching member having at least one transfer state in which it interconnects the inputs/outputs of the first memory assembly with the data input/output interface, and an interchange state in which it interconnects the data inputs/outputs of the two memory assemblies. The logic controller has a free state in which it is capable of receiving a read or write command from the external processor, a read active state which is directly accessible from the free state in response to a read command, a write active state into one of the two memory assemblies in which the logic controller puts the switching member into its transfer state, a copy active state from one of the memory assemblies to the other in which the logic controller puts the switching member into its transfer state, and at least one error state, with execution of a write command from the external processor requiring the logic controller to pass through its write state, and then through its copy state, prior to returning to its free state.

According to another aspect of the invention, a second non-volatile read/write auxiliary memory is associated with the logic controller, said second auxiliary memory constituting a marking vector, being of the same address size as each of the memory assemblies, being addressed in the same manner as the memory assemblies, and with each component of the second auxiliary memory, when in its normal state, serving to prevent content-changing access to the word having the address associated with said component in each of said memory assemblies; in response to a write command from the external processor, the logic controller activates the marking vector prior to writing in the first memory assembly in a selective manner depending on the requested sequence of addresses which it verifies against the said partitioning information, and after the first memory assembly has been copied into the second memory assembly, the logic controller returns the marking vector to its normal state, with any anomaly causes the logic controller to take up an error state.

Preferably, the switching member also has a comparison state for comparing the data outputs from the two memory assemblies in order to inform the logic controller whether they match. In addition, when in its comparison state, the switching member is capable of performing a prior check (e.g. a parity bit check) on the respective outputs from the two memory assemblies in order to identify any word that includes changed bits.

In a variant, the execution of a write instruction includes passing through an opening active state ("read updating") during which all of the words constituting the subassembly to be written are scanned and during which the marking vector state corresponding to each of these words is changed to enable a content-changing operation thereon, with the logic controller also putting the switching member in its comparison state during said opening active state, thereby enabling the processor to request that the contents and in particular the coherence of the object be checked prior to writing per se.

Furthermore, in the read state, the logic controller authorizes simultaneous reading of both memory assemblies, while the switching member is in its comparison state, so that the value read from both memory assemblies is taken as valid only if the data output from both memory assemblies matches.

According to another aspect of the invention, the logic controller has another state called the "create-object" state enabling the processor to define said partition information with the logic controller, and yet another state called the "delete object" state enabling partitions which already exist in memory to be modified, in particular for deleting emplacements for objects which are no longer required.

Advantageously, the partition information includes chaining information between the addresses of words in the memory assemblies and at least one set of pointers pointing to the addresses of the first and the last words of each subassembly (object), or better still, the partition information includes at least one other set of pointers for defining at least one other subsubassembly level (sub-objects) within each subassembly (object).

According to another aspect of the invention, the memory includes a control register in non-volatile read/write memory, which is directly addressable by the external processor, which is the sole part of the memory to receive both the addresses and the data from the external processor, and which is suitable for containing a current command together with a level of access within the partition.

BRIEF DESCRIPTION OF THE DRAWINGS

An embodiment of the invention is described by way of example with reference to the accompanying drawings, in which.

MORE DETAILED DESCRIPTION

The accompanying drawings and the appendices to the present description include descriptive matter. They are therefore to be considered as forming a part of the description, not only for the purpose of making the invention easier to understand for the person skilled in the art, but also for contributing to the definition of the invention, where appropriate.

Figure 1:
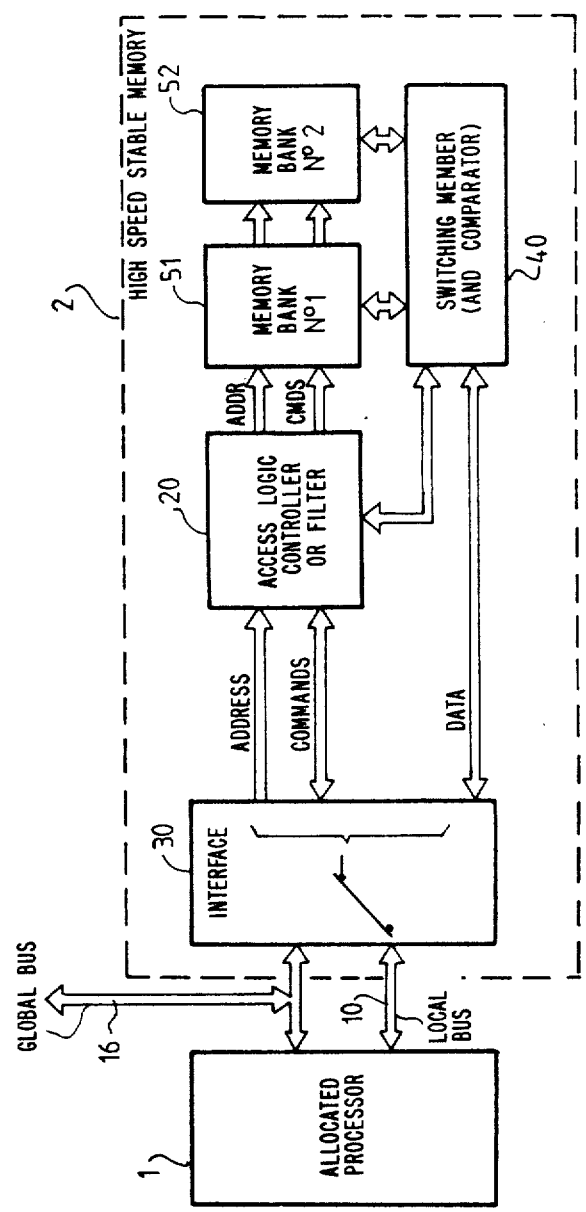
FIG. 1 is a block diagram of a circuit in accordance with the invention.

In FIG. 1, a processor or a computer card including a processor is referenced 1 and is connected firstly to a local bus 10 and secondly to a global bus 16 which may be shared with other similar processors.

These two buses 10 and 16 connect the processor 1 to a high-speed stable memory card 2, or more exactly to an interface 30 thereon. The interface 30 is provided with switching whose normal state causes the processor 1 to communicate with the memory 2 via the local bus 10. However, when the processor 1 is inactive or unavailable, the other switching state allows the memory 2 to be connected via the interface 30 to the global bus 16, thereby enabling the high-speed stable memory to be shared between a plurality of processors.

Nevertheless, the normal situation consists in the memory 2 being allocated entirely to the processor 1 which is therefore called the allocated processor. This situation is assumed in the following description.

In addition to the above-mentioned interface 30, the stable memory 2 comprises an access logic controller or filter 20, two memory assemblies 51 and 52 which are referred to more briefly as memory banks (it should be observed that the term "bank" is not used with exactly the same meaning in this specification as in the above-mentioned earlier patent application), and a switching member 40 which advantageously includes a comparator.

The addresses and the commands taken from the local bus 10 by the interface 30 are transmitted to the access logic controller 20 which forwards them to the memory baks 51 and 52 provided certain conditions are satisfied and which simultaneously controls the states of the switching member 40.

The data taken from the local bus 10 by the interface 30 is applied directly to the switching member 40 which switches the data in various different ways to the memory banks 51 and 52.

In accordance with the invention, the access logic controller or filter 20 is associated with a non-volatile read/write auxiliary memory for containing information defining an identical partitioning of the two memory assemblies into at least one level of disjoint subassemblies, which are referred to below as "objects".

Figure 2:
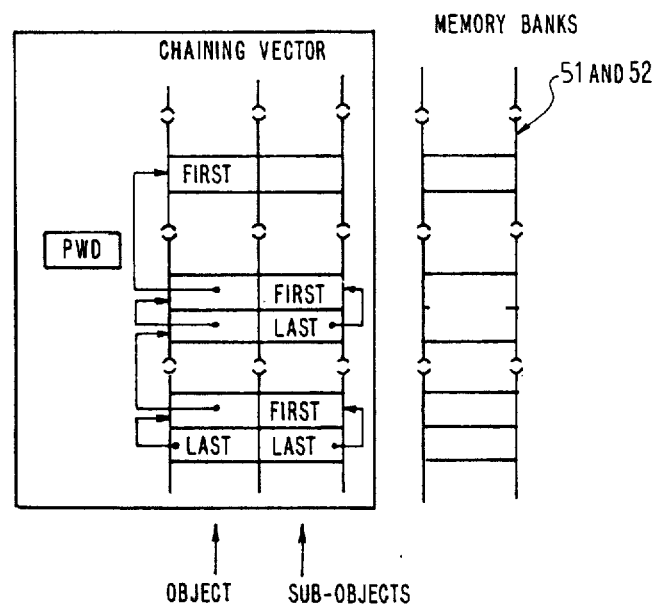
FIGS. 2 and 2A are respectively a table for explaining the interaction of a chaining vector with banks of memory in accordance with the invention, and a flowchart showing the mechanism which uses said chaining vector.

FIG. 2 shows the auxiliary memory, and in particular:

an object defined by the address of its first word ("first"), a reference from each other memory word included in the object back to the preceding word ("PWD"), and finally a "last" indication in the last word of the object; and sub-objects within said object, with the sub-objects being defined solely by marking the first and the last memory words of each sub-object.

This information can be stored in the form of a vector memory having the same address size as each of the two memory banks 51 and 52.

A chaining vector CV is thus defined, and its general role is described below with reference to FIG. 2A.

At each memory access request 80 made by the external processor for a specified address, a function 81 examines the contents of the chaining vector CV at said address. The address of the previously-requested memory word is stored in the register PWD. The function 82 determines whether the contents of the CV is the same as the contents of the PWD register prior to authorizing memory access (at 83), and then puts the new address into PWD. This process continues until the entire object has been run through.

The first requested word constitutes an exception. A check is performed to verify that it is indeed the first word of an object. Providing it is, its address is then transferred to PWD.

Further, prior to moving on to another object (or to performing another operation on the same object), a check is performed to verify that the last word (the end-mark) of the object has been accessed.

Examples are given below of operations, and in particular of read and write operations, which apply the above chaining vector system of access.

For the time being, it may be observed that each time a new object is to be created in memory, it is necessary to begin by initializing the access logic controller or filter 20 with the topology the object.

This consists in writing the corresponding pointers (at object level only) in the chaining vector, together with the end marks (first and last words), and the end marking operation applies both to the object and to all levels of sub-objects.

Preferably, memory access is forbidden for words which do not belong to any object. For this purpose, the chaining vector is initialized with a value that cannot be interpreted as a pointer, and this value will give rise to an error if an attempt is made to access the corresponding address.

These initializing operations can only be performed when the logic controller or filter 20 is in a special state, as described below. Thus, the chaining vector CV cannot be directly modified by the external processor, and it therefore retains the property of providing protection.

The chaining vector makes it possible to ensure that operations on an object are indeed "atomic" (as defined above), and also to prevent the memory zones belonging to two different objects from overlapping.

Mutual exclusion and the possibility of recovering data under most error conditions are ensured by the fact that writing is split into an ordered (and necessary) sequence of "atomic" operations as described below.

Figure 3:
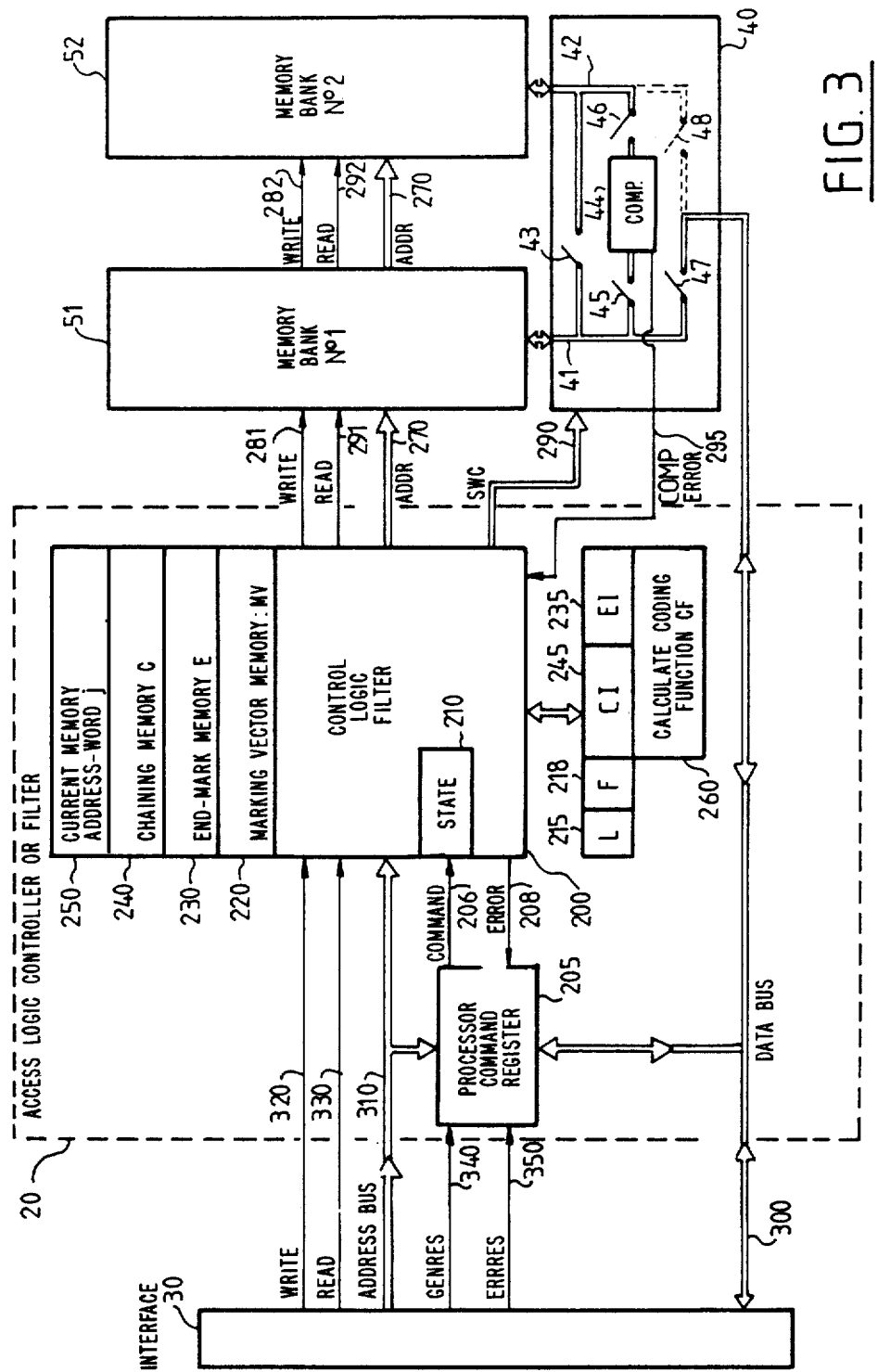
FIG. 3 is a more detailed block diagram of a particular embodiment of a circuit in accordance with the invention and FIG. 3A is a block diagram of a portion of FIG. 3 modified in such a manner as to show up certain aspects of the invention more clearly.

Before doing that it is appropriate to describe the functions of the switching member 40 (see FIG. 1), which functions are detailed in FIG. 3.

The switching member includes:

a transfer state in which it interconnects the inputs/outputs of the memory bank 51 with the data bus 300; and an interchange state in which it interconnects the data inputs/outputs of the two banks 51 and 52.

It preferably also includes:

a comparison state for comparing the data outputs from the two banks 51 and 52 with each other; and where applicable, a second transfer state in which it is the inputs/outputs of the second memory bank 52 which are connected to the data input/output interface 30 via the data bus 300.

The logic controller 20 includes:

a free state where it is ready to receive a write or a read instruction from the external processor;

a read active state which is directly accessible from the free state in response to a read instruction (with the switch 40 then being placed in one or other of its transfer states, or preferably in its comparison state, followed by one of its transfer states);

a write active state for writing in the first memory bank 51, with the switch 40 placed in the corresponding transfer state;

a copy active state for copying the first memory bank into the second memory bank, in which the switch 40 is placed in its interchange state; and at least one error state, as described below.

Performing a write instruction requires the logic controller to pass through its write state and then through its copy state prior to returning to its free state.

In each active state including access to the memory (for reading, writing, or copying), the logic controller verifies that the sequence of addresses requested by the external processor covers a complete subassembly or object (or subject, etc.) as defined by the corresponding partitioning information in the chaining vector. When a write instruction is performed, the logic controller 20 also makes use of a marking vector which is likewise of the same size as each of the memory banks 51 and 52. This marking vector may comprise a single bit in each position. The normal value (e.g. zero) prevents content-changing access to the word whose address is associated with said bit (which is a component of the marking vector) in both memory banks 51 and 52. In contrast, an active value of one allows such content-changing access.

In response to a write instruction, the logic controller 20 activates the marking vector prior to writing in the first memory bank 51. This activation operation is selectively performed solely on those components of the marking vector which correspond to the sequence of addresses requested by the external processor. At the same time, the controller verifies that the sequence of addresses requested by the external processor does indeed cover an entire object or sub-object as defined by the chaining vector(s).

The modified portions of the marking vector are only returned to the normal state after the first memory bank 51 has been copied in the second bank 52. Any anomaly causes the logic controller 20 to move to an error state.

The marking vector may be activated during the active write state itself, but naturally prior to writing per se. A safety margin is provided by virtue of the previous contents of the object remaining unchanged in the second memory bank 52 until writing to the first memory bank 51 has been completed.

However, it is currently preferred (see appendix A1) for the execution of a write instruction to begin with the logic controller 20 going to an opening active state (also referred to as a "read update" state) during which the entire contents of the words constituting the object or the sub-object to be written are scanned, and during which the state of the corresponding marking vector bits is changed, preferably after verification that the contents (relating to the previously-written version of the object) of both memory banks are identical.

The write instruction then continues by the logic controller 20 moving to its write active state (without altering the marking vector) and then to its copy active state in which the marking vector is returned to its normal state after each copying operation on each of the memory words concerned.

A read instruction may be performed in the same manner as the above-mentioned opening or read update active state, except for the highly important fact that the marking vector is not modified, i.e. the marking vector remains in its normal state which prevents any modification of the memory banks 51 and 52.

A read operation is accompanied by a comparison between the contents of the two memory banks prior to the data as read being delivered to the external processor via the interface 30.

Advantageously, when the switching member is in its comparison state it is also arranged to perform a prior verification on the respective outputs from the two memory banks in order to determine whether any memory bits have "decayed" by using an appropriate error-detection code, e.g. a parity check. If decay has occurred it is then possible to update the erroneous memory bank from the unaffected memory bank.

It is also necessary to create object structures and sub object structures in the memory.

This could be done once and for all on manufacture, but such a solution is highly inflexible and not suitable for most applications.

It is thus preferable for the logic controller to have another state for creating objects, allowing the external processor to define partitioning information in advance, i.e. to define the chaining vectors under the control of the logic controller.

It is advantageous to provide yet another state, for deleting objects, enabling memory locations relating to objects that are no longer required to be released for further use.

However, more generally, a single additional state may be provided for allowing the external processor to dynamically modify the partitions which exist in the memory.

Thus, the invention can allow the logic controller to define a new object on the basis of existing objects (which become sub-objects) or to split up an existing object into new sub-objects. In either case, the contents of the objects may be conserved.

The above-described functions may be performed in various different ways. A particular way of performing them is described below.

FIG. 3 shows the stable memory card of FIG. 1 in greater detail and as applicable to to one particular embodiment of the invention.

The interface 30 splits the local bus (or the global bus) into a data bus 30, an address bus 310, a write line 320 and a read line 330 where applicable (which signals are directly interpretable by the memory banks 51 and 52), and also into lines 340 and 350 which may be used respectively for conveying a general reset signal GENRES and a reset after error signal ERRRES.

The logic controller 20 includes a control logic circuit (the "filter" per se), referenced 200 which is associated with:

a STATE register 210;
a memory 220 for the marking vector MV;
a memory 230 for the chaining end-marks E;
a memory 240 for chaining C per se; and
a memory 250 for the address currently requested by the external processor.

The control logic 200 is made, in practice, as a hard-wired logic circuit, e.g. by means of programmable logic arrays, rather than by means of microprocessors.

A register 205 receives the address bus 310 and the data bus 300 and stores commands coming from the external processor. These commands are provided directly thereto by virtue of this register having its own special address as seen from the external processor.

It also receives the above-mentioned signals 340 and 350. The dialog between the register 205 and the control logic 200 consists essentially in transferring the command into the STATE register 210 via a line 206 whenever authorized to do so by the logic circuit 200. A return line 208 enables the control logic circuit 200 to send an error signal to the processor command register 205. This error signal can then be read by the external processor.

Figure 2A:
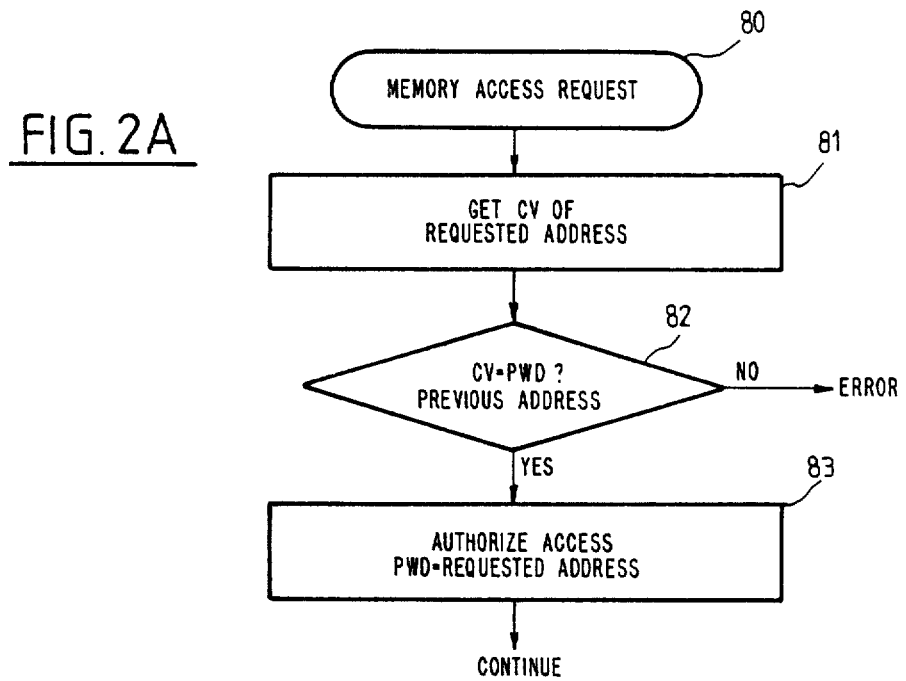

The logic access controller 20 further includes:

a memory 215 for storing a level L, which memory may take the values 1 for an object, 2 for a sub-object, and 3 for a sub-object of a sub-object (and so on, if necessary);

a memory 212 for an invariant F representative of the first word of an object, or of a sub-object, or of a sub-object of a sub-object, (and so on, if necessary);

a memory 254 for a quantity CI which is a current chaining indicator and in which the value C for the currently addressed word is stored, the memory CI performs the function of the PWD register mentioned with reference to FIGS. 1, 2, and 2A; and a memory 235 for storing a pair of data items EI defining the end-marks applicable to the word currently being addressed (and naturally taking account of the current level L).

Finally, a member 260 calculates a coding function using the memories 235 and 245. The coding function is defined below.

The connections from the access logic controller 20 to the memory banks 51 and 52 are limited to transferring the same address information to both banks, together with the selective transfer of the read and write control signals as appropriate to said memory banks 51 and 52. The address bus is referenced 270. The write commands for the banks 51 and 52 are respectively referenced 281 and 282. The read commands for the banks 51 and 52 are respectively referenced 291 and 292.

The data inputs/outputs of the bank 51 are on a bus 41. The data inputs/outputs of the bank 52 are on a bus 42. These two buses may be interconnected by a switch 43 of the switch member 40 (with the switch 43 being closed when the switch member is in its interchange state).

The buses 41 and 42 may be applied to opposite sides of a comparator 44 by respective switches 45 and 46 which are both closed when the switching member is in its comparison state.

Another switch 47 serves to connect the bus 41 to the data bus 300. It may be advantageous to provide yet another switch 48 for connecting the bus 42 to the data bus 300.

The states of the switches 43 to 47 (and 48 if present) are under the control of switching control signals SWC conveyed via lines 290 from the logic controller 20. The comparator 44 can return a comparison error via a line 295 to the access logic controller 20.

Technically, the high-speed stable memory of FIG. 3 is implemented in the form of a read/write memory card which is backed up by a battery and which is directly addressable by the external processor via the interface 30 which serves to provide interconnections and, where appropriate, to switch between the local bus and the global bus as described above with reference to FIG. 1.

A watchdog is added thereto and is set by the STATE register 210 changing from the free state to any other state. The watchdog is reset by the STATE register returning to the free state. The function of the watchdog is to ensure that the processor completes an access stage in a given length of time, which length of time may depend on the nature of the access stage. If this length of time runs out, the watchdog signals an error.

Any error, and also the STATE register 210 returning to the free state, give rise to an interrupt which is applied to the external processor.

The only item on the stable memory card which can be directly addressed by the external processor is the command register 205. The processor can thus write COMMANDS therein and a list of such commands in one particular example are given in appendix A2 together with the associated level L.

On reaching the STATE register 210, the COMMAND determines the kinds of access which can be made to the memory banks 51 and 52 (B1 and B2 in appendix A2).

Each COMMAND is associated with a FUNCTION (which generally has the same name). The FUNCTION is performed each time the external processor presents a new address on the address bus 310. This address is either accompanied by a pending word (when reading) or else accompanied by a real word (when writing) or else accompanied by a null word (in particular when the memory is copying the first bank into the second).

The vector memories E and C (referenced 230 and 240) are not addressable by the external processor.

Each component of the vector which constitutes the memory E is constituted by a pair of bits. The first bit is set to 1 if the address of the pair in the memory E corresponds to the address of the first word of an object (or a sub-object, etc.) in memory banks 51 and 52. The second bit is set to 1 if the address relates to the last word of an object (or a sub-object, etc.), and both bits are reset to zero otherwise.

This applies to a single object level in the memory. Naturally, each word addressed in the vector memory E contains as many pairs of bits as there are possible levels of objects and sub-objects.

The vector memory C could be constituted in the form of a table of pointers interconnecting all the words which individually constitute an object (and consequently its sub-objects, etc.). However, these memory vectors necessarily have the same address size, i.e. the same number of addressable locations, as the banks 51 and 52. If the banks 51 and 52 each possess a megaword or a megabyte (e.g. an 8-bit byte), an address requires 20 bits.

Since the memory C is to perform chaining, the chaining pointers if written out in full would thus require 20 bits each. This requires a considerable quantity of memory which may be reduced, in accordance with the invention, by employing a coding technique.

The coding technique consists in storing in the chaining vector C (memory 240) the sum of the number of 1 bits in the pointer and the number of 1 bits contained in the vector memory C for the preceding word, i.e. the word designated by the pointer.

Let the address of the current word in the object be written $word_i$ and the address of the preceding word as $word_{i-1}$.

The chaining coding functions CF then becomes:

$C(word_i) = CF(word_{i-1}, C(word_{i-1})) =$ number of 1 bits in the data stored at address $word_{i-1}$ + number of 1 bits in $C(word_{i-1})$.

Since this definition is recursive, the memory 245 simply serves to store the chaining value for the word currently being addressed. Chaining updating or incrementing can then be written:

$CI := CF(word_i, CI)$.

The procedure to be performed with the first chaining word remains to be determined, as does the procedure for creating an object.

When creating an object, $C(word_i)$ must be calculated for each word of the vector memory C. The memory CI is initialized to zero. The words are processed in sequence, and for each word the following is performed:

$C(word_i) := CI$ $CI := CF(word_i, CI)$.

The result is that every second word receives as value C the number of 1 bits in the address of the first word.

Then, whenever accessing a first word, the first endmark E is compared with zero in order to check that it is indeed a first word, after which, the following is performed:

$CI := CF(word_i, CI)$, for preparing CI for the following word.

The first word register F referenced 218 will have served to indicate whether or not the first word is the first word of an object (and of an object only, as opposed to a sub-object).

The register EI has the same size as a word in the vector memory E. The register EI thus stores, at each level, a pair of bits indicating whether the current address is the first word of an object (or a sub-object, etc.), or the last word of an object (or a sub-object, etc.).

The portion of EI to be taken into account is defined by the value of L contained in the register 215.

The contents of the register EI is reset to zero at the beginning of each memory access stage. If an end-mark is encountered during an access, it is written into register EI.

This operation of updating the EI register from the contents of vector memory E is referred to as "EXTENDED OR" and is written v. Thus:

EI : = EIvE(word$_j$).

The truth table of this EXTENDED OR function for a given level appears in appendix A3. The error states as taken into account during error processing are described below.

At the end of an access stage to an object or a subobject, EI|L| must be equal to (1,1).

The structure of the marking vector MV contained in the memory 220 is simpler, since in this case there is only one bit per possible address in memory banks 51 and 52. This bit is normally zero in order to prevent content-modifying access to the memory banks. When the bit is set to 1, the contents of the corresponding address in the memory banks may be modified.

The current address, written word$_i$, is contained in register 250.

The various functions performed by a stable memory in accordance with the invention are now described. In each case, the description is made with reference to two documents:

a single figure constituting a state table; and one or more figures showing the sequence of operations performed by the logic controller in response to processor requests. In such figures, the right-hand portion concerns functions performed by the memory itself and the left-hand portion concerns operations performed by the processor, which operations may be constituted by:

a COMMAND associated, if applicable, with an indication of an access level; and an address, word$_i$, accompanied by a pending word referenced value variable, or VAL VAR for short, if a read operation is taking place. If a write operation is taking place, the word to be written is indicated by the processor and is noted "word value".

Further, in the figures including a "state table", the main states having a direct relationship with the essence of the invention are shown using heavy lines. Auxiliary states, for example error processing and overall initialization, are shown using light lines.

These state tables are important in that they define the permissible transitions between the various states.

Figure 3A:
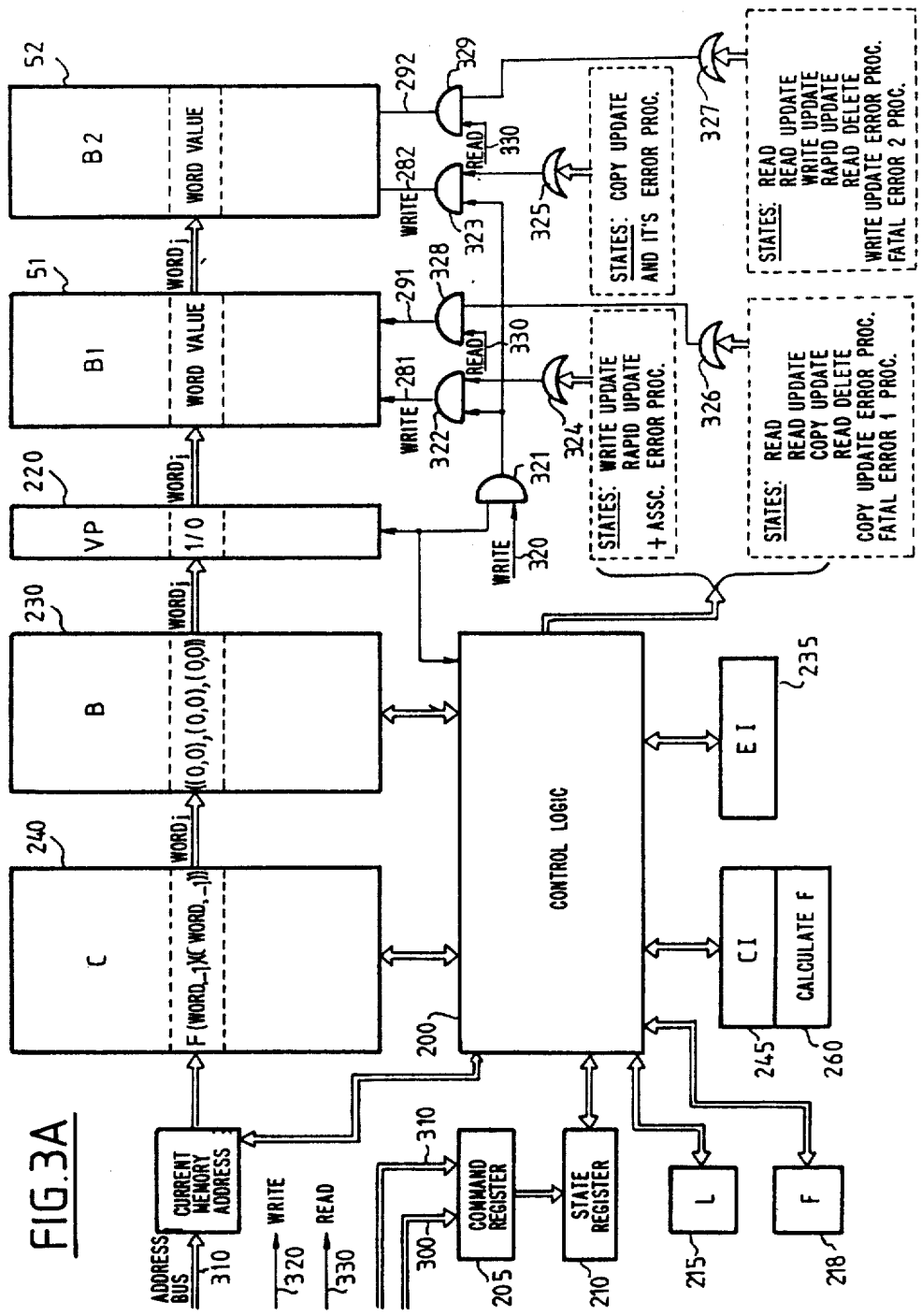

FIG. 3A shows a portion of the items shown in FIG. 3, but in a manner intended to show up the close relationship between the hardware structure of the stable memory and the functions described below. It may be observed, in particular that logic gates 321 to 323 (AND gates) and logic gates 324 to 327 (OR gates) are used to obtain mutual exclusion between the two banks while writing. In practice, the output from gate 232 is physically looped back to the input of gate 322, and vice versa. AND gates 323 and 329 enable reading.

Figure 4:
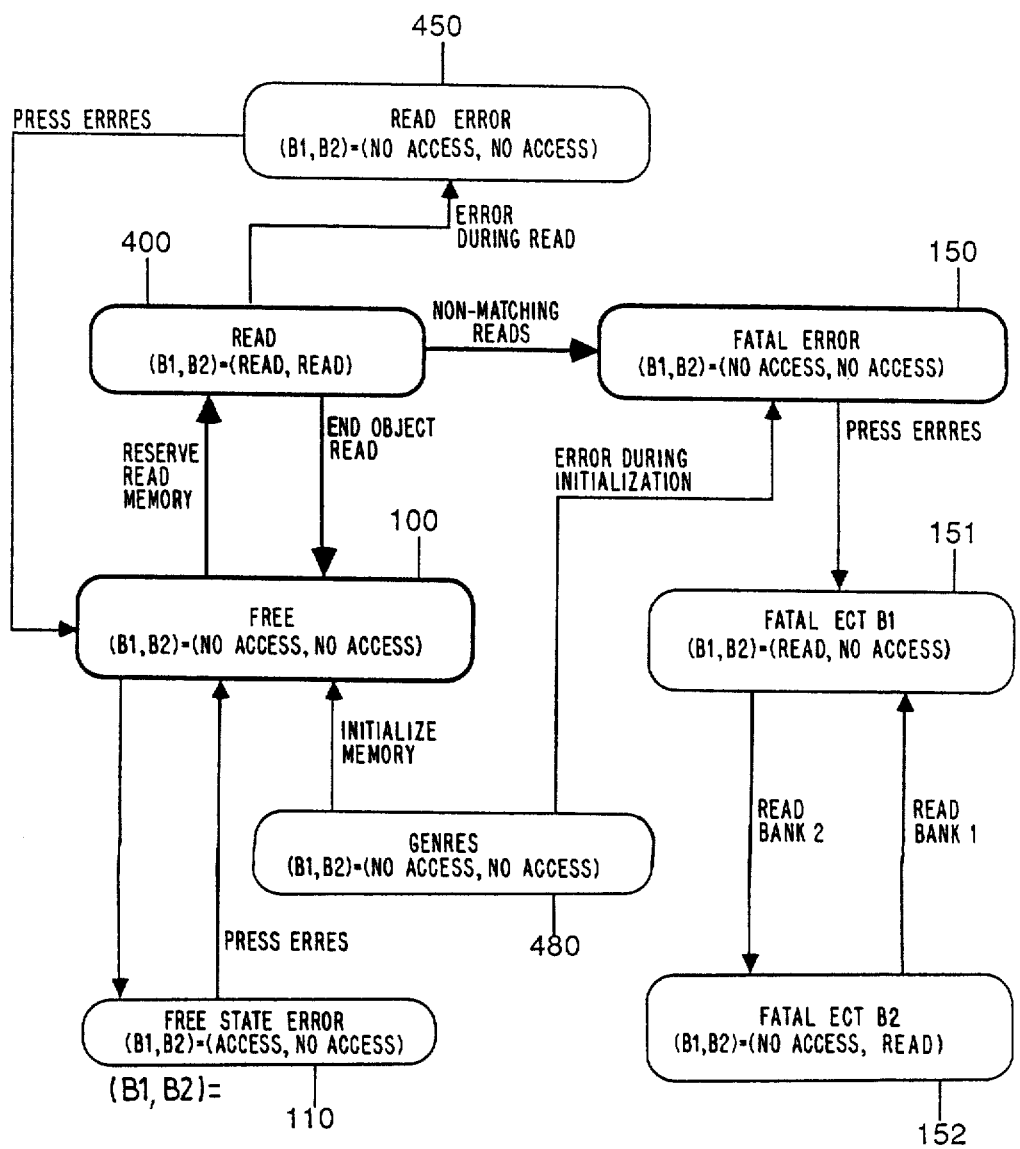
FIG. 4 is a state diagram relating to reading in accordance with the invention.
Figure 4A:
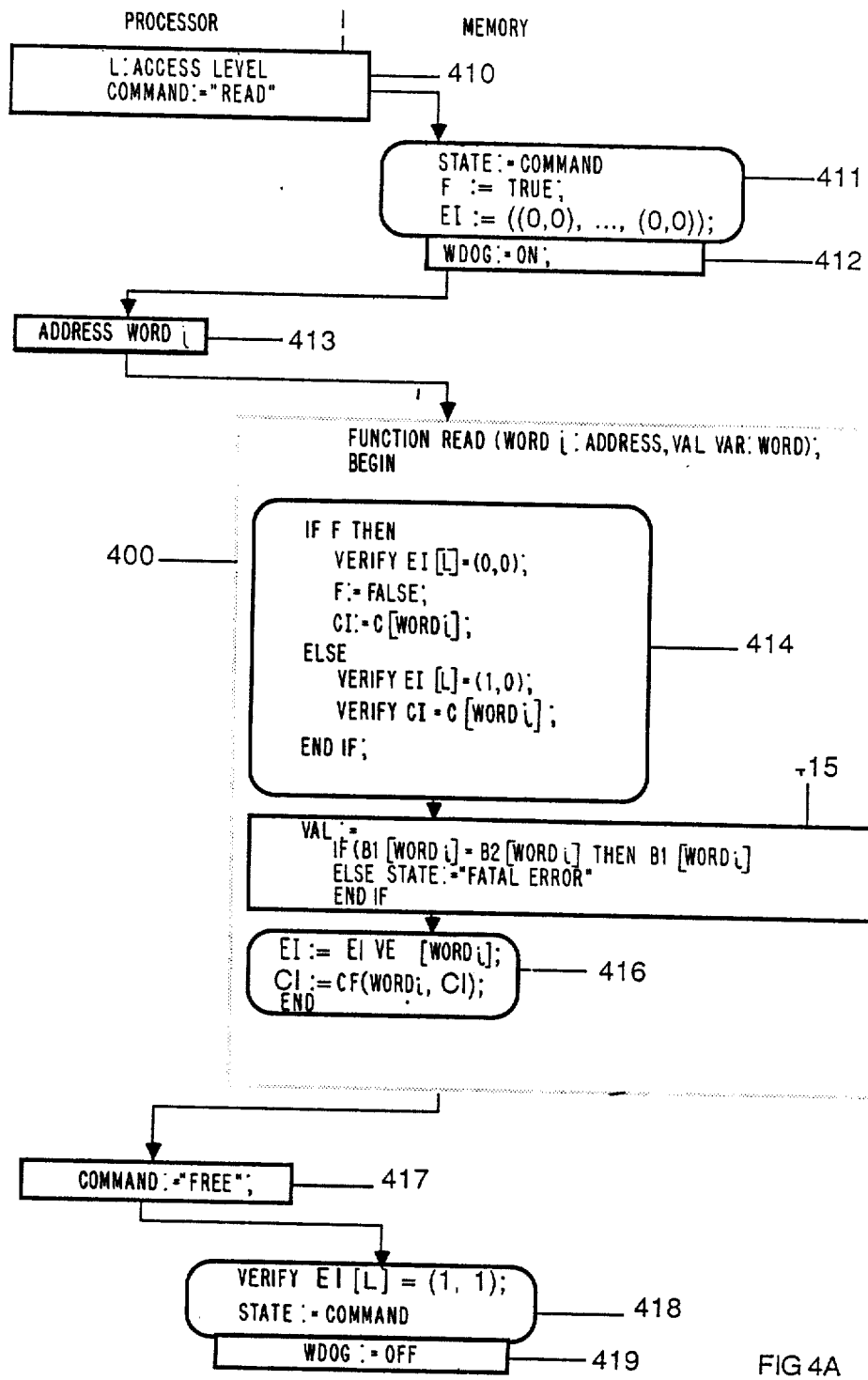
FIG. 4A is an algorithm diagram showing how a read operation proceeds.

There follows a description of an object (or a subobject) being read, with reference to FIGS. 4 and 4A.

The starting point is the free state 100.

At 410, the processor delivers a read COMMAND together with the corresponding access level L.

At 411 the memory performs an initialization stage after the command, consisting firstly in writing the command in question into its STATE register 210, then in setting the contents F of its first word register 218 to TRUE, and then in resetting to zero the entire contents EI of its current end mark register 235.

Stage 412 then consists in setting the watchdog to the appropriate time period.

Thereafter, the processor sends the address of the word to be read at 413. It will be understood that the addresses presented must run sequentially through the words which constitute the object in question.

The memory then implements a read FUNCTION 400, which is repeated for each of the addresses presented at 413.

Prior to reading per se, a plurality of stages 414 serve to verify chaining, with chaining verification now including verification of the end-marks.

If F is true, then we are on the first word, and the contents EI of the register 235 has already been subjected to the EXTENDED OR operation for the relevant level L, and this is verified.

F is then set to FALSE, and the initial value of the chaining indicator CI is calculated in the manner described above.

If not on the first word, verification is performed to check that a first word end-mark of an object has indeed been encountered, and the chaining is also verified.

If all of these verifications are good, then the address requests coming from the external processor using the memory are in conformity with the partition information contained in the logic controller.

The memory can then move to stage 415 which consists in verifying that the two words contained in banks B1 and B2 at address word$_i$ are equal, in which case one of them, e.g. word B1(word$_i$) is taken.

Otherwise, a fatal error has occurred and the system passes to state 150 shown in FIG. 4.

There follows a stage 416 which consists in incrementing the chaining, firstly by performing an EXTENDED OR operation on EI, and then in determining the new value for the chaining indicator CI.

When this has been completed for all the words of addresses word$_i$ presented by the processor at 413, the processor presents the COMMAND "free" at 417.

At stage 418, the memory begins by verifying that the last end-mark has indeed been reached in EI(L), and it is then ready to accept the command for passing to the free state, thereby deactivating the watchdog (at 419).

Some of the stages described above recur frequently. This is true, in particular, for stage 411 which is shown in isolation in FIG. 4B under the label "initialization after command".

Figure 4B:
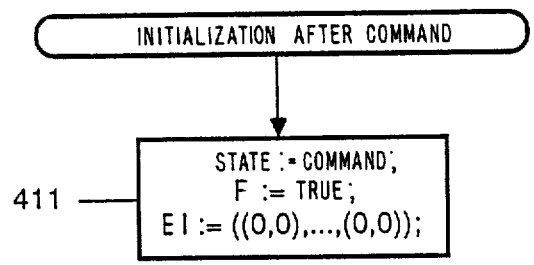
FIGS. 4B to 4E are diagrams showing various repetitive sub-functions referred to in FIG. 4A.
Figure 4C:
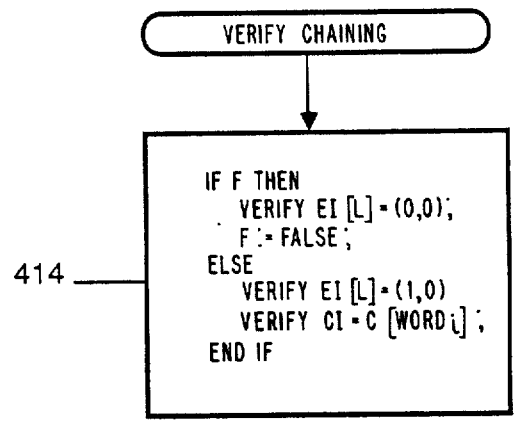

This is also true of stage 414 which appears in FIG. 4C under the label "verify chaining".

Figure 4D:
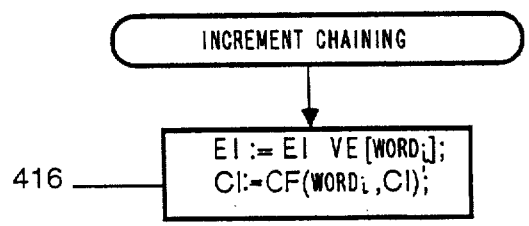

This is also true of stage 416 which is shown in FIG. 4D under the label "increment chaining".

Figure 4E:
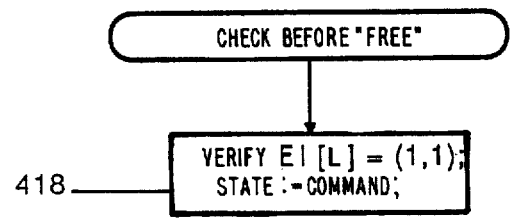

Finally, this is true for stage 418 which is shown in FIG. 4E under the label "check before "free"".

Figure 5:
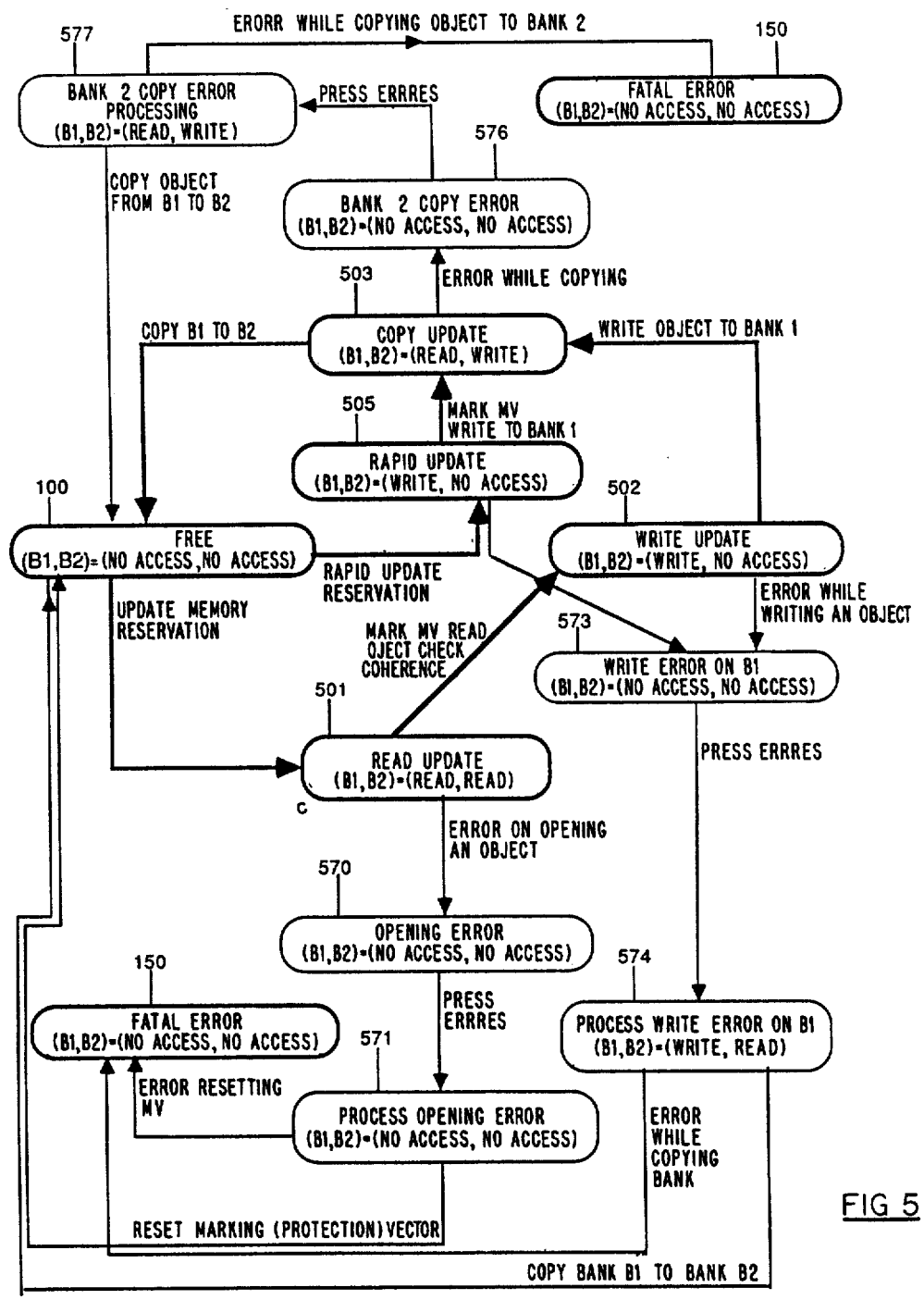
FIG. 5 is a state diagram relating to write operations in accordance with the invention and FIGS. 5A and 5B are algorithm diagrams describing a write operation in accordance with the invention.
Figure 5A:
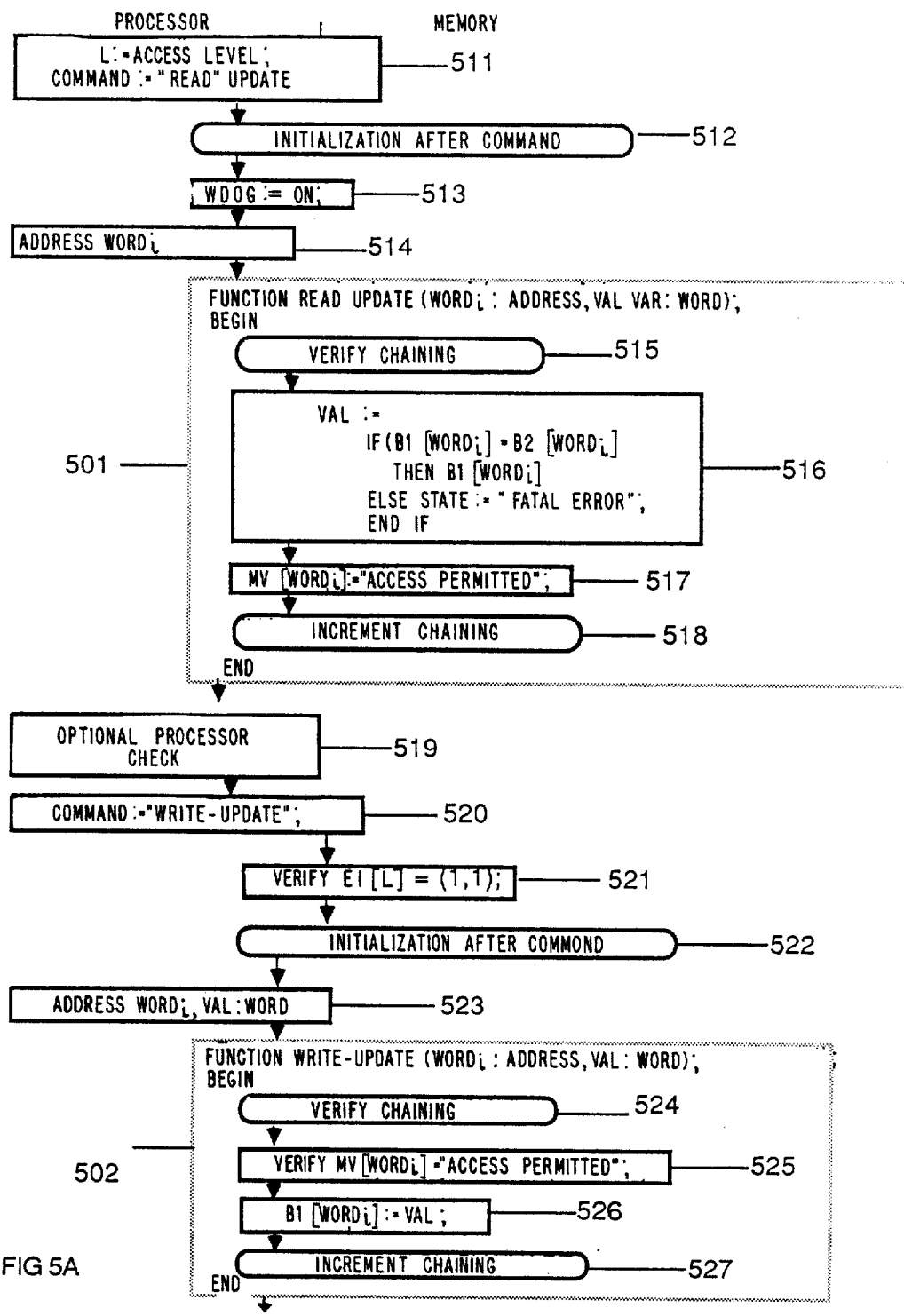
Figure 5B:
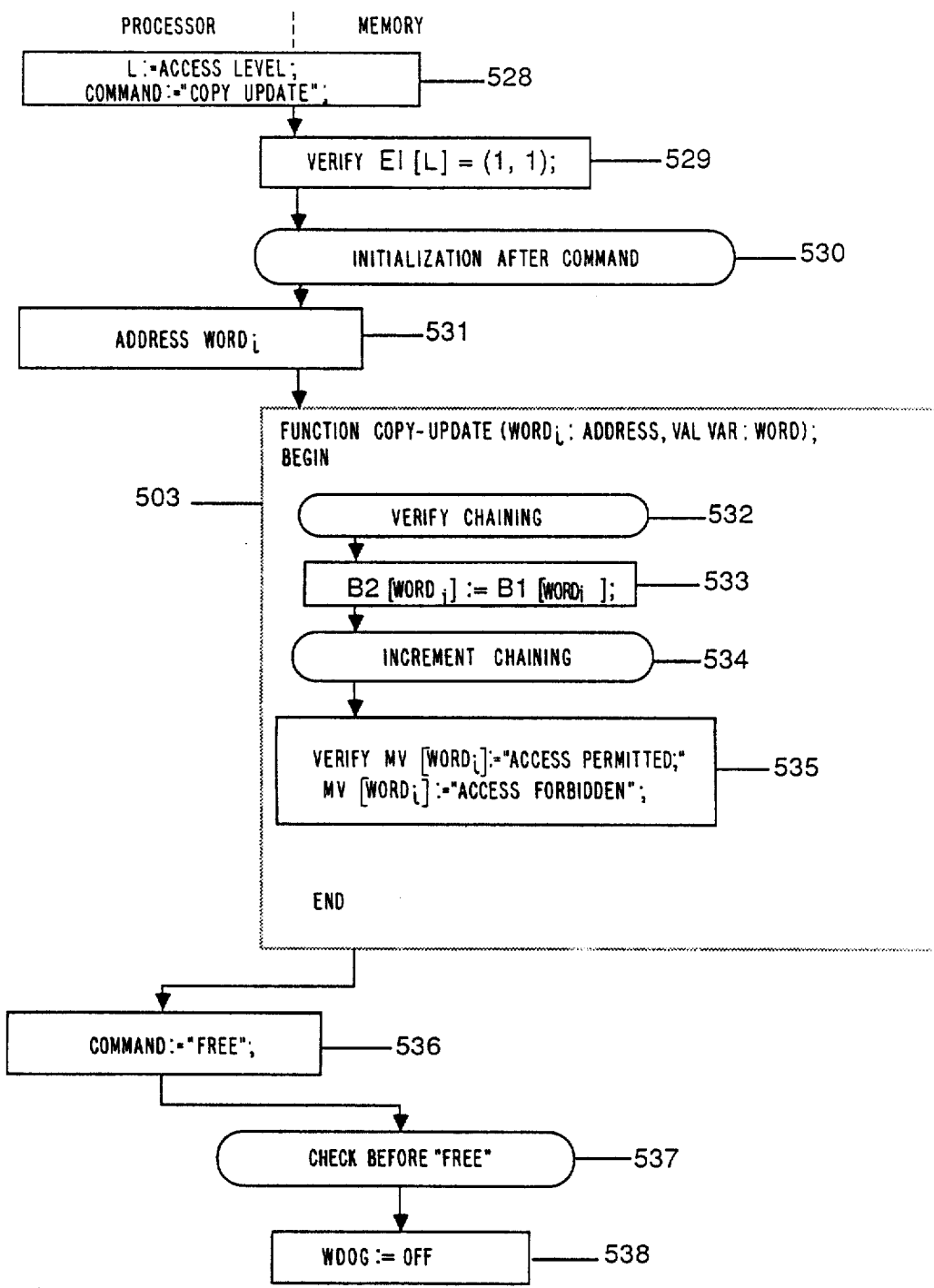

Reference is now made to FIGS. 5, 5A, and 5B for describing writing, which is certainly one of the most important aspects of the invention.

Two write modes are provided. The description begins with the more complete write mode.

At 511, the processor delivers a read-update COMMAND, together with an access level L. The memory responds at 512 by initialization after command (FIG. 4B), and then by setting the watchdog at 513 to a predetermined value, which may be different from the value used in reading.

At 514, the processor repetitively delivers a word address, as during reading.

The entire read-updating function which then takes place is very close to reading per se, with the sole difference being the insertion of a stage 517 which causes the protection vector to pass to "access allowed" for the address of each word "visited" in this manner.

It will be understood that stages 515, 517, 518 are identical to stages 414, 415, 416, respectively.

An optional check is provided at 519 for the external processor using the memory. This check could also apply to reading, per se. Not only is the structure of the data contained in the stable memory verified by the stable memory itself to verify that does indeed constitute an "object", the user may wish to perform further verifications on the coherence of the data contained in the memory locations indicated.

Thereafter, the processor delivers a write updating command at 520.

The stable memory responds at 521 by verifying that the last end-mark of the object or sub-object has indeed been reached during the preceding read-updating procedure. Then, at 522, it performs initialization after command (see FIG. 4B).

The processor then repetitively delivers (at 523) an address and a value for a word to be written at said address.

The memory responds thereto by the write-updating FUNCTION 502.

This procedure includes a new verification of chaining 524 (see FIG. 4C).

Finally, at 525 the memory verifies that the protection vector is in "access permitted" condition for the address $word_i$ presented by the processor.

After performing this verification, writing per se takes place at 526, with the value presented by the processor being written into bank B1 at address $word_i$.

Stage 527 is then an increment chaining stage as shown in FIG. 4D.

When the procesor considers that it has presented all of the addresses corresponding to the object (or sub-object, etc.), it delivers a copy update COMMAND 528.

The memory responds thereto as before by verifying at 529 that the write update stage has continued right up to the last end-mark of the object or the sub-object. Then, at 530, it performs initialization after command as shown in FIG. 4B.

The processor then presents, at 531, an address $word_i$ accompanied by a "don't care" word (writing is being performed in the memory, but the word presented is not taken into consideration). This is repeated as before.

On each occasion, the memory performs the copy update FUNCTION 503 which begins at 532 by verification of the chaining (see FIG. 4C).

Copying per se takes place at 533 by writing the recently written contents of memory bank B1 at address $word_i$ into memory bank B2, also at address $word_i$.

Thereafter, at 534, the memory increments the chaining (see FIG. 4D) and then at 535 it verifies that the protection vector for address $word_i$ is indeed in the "access permitted" condition, after which it causes it to pass to the "access forbidden" condition.

When the processor considers that it has gone through all of the addresses, it delivers the COMMAND "free" at 536.

The memory responds thereto at 537 by performing "check before "free"" as shown in FIG. 4E, and then by deactivating the watchdog at 538.

The above description relates to the essential operations required of memory, namely writing and reading.

Another, simplified, write mode is possible, in particular when writing the initial contents to an object (when the memory therefore has no earlier version to verify).

The "read update" and "write update" stages can then be performed in a single stage called a "rapid update" stage. This is identical to "read update" except for the following two points:

stage 521 is omitted, while stage 522 includes setting the watchdog for an appropriate time period; and above all, stage 525 is no longer a verification stage and is solely a stage during which the marking vector MV ($word_i$) is put into its "access permitted" condition.

The "copy update" stage is unchanged.

As already mentioned, the partitioning information, i.e. the end-marks and the chaining vector could be written once and for all by hard-wiring, or they could be reversible using special, very unusual, procedures.

However, it appears preferable to allow the processor using the stable memory to create the object, sub-object, etc. structure and also to allow it to perform deletions in said structure.

Reference is made initially to creating objects.

For this type of procedure, there is a difference depending on whether or not the system is on the last word of an object (or a sub-object), and consequently there is a further difference in the case of an object (or a sub-object) constituted by a single word.

For simplification purposes, this situation gives rise to conditional branches being inserted into the mechanism described, even though the Pascal-type pseudo code used generally excludes any such branching.

Also for simplification purposes, processor interventions have been numbered by ringed order numbers which are referred to in the present description by putting numbers between parentheses.

The first processor intervention, referenced 611, is to define an access level L together with a COMMAND which is the "create object" command when a multiple word object is to be created or a "create-end-of-object" command when the object is one word long.

The memory responds by a stage 612 which is again initialization after command as shown in FIG. 4B followed at 613 by setting the watchdog.

For each address $word_i$ presented at 615 by the processor (for a multi-word object), the memory responds with a create-object FUNCTION 601.

At 616, the memory verifies that no end-mark has already been placed at the current level L at address $word_i$.

If the word is a first word, stage 617 places the corresponding end-mark in the end-mark vector E at the relevant address $word_i$ and level L, and then sets F to FALSE.

If the first level is involved, stage 617 initializes the chaining indicator CI to zero.

Otherwise, stage 618 gives the chaining indicator the value already established for the vector C at address $word_i$ during the first level for which L was equal to 1.

We now assume that we are no longer on the first word.

If no longer at the first level (i.e. object level), stage 619 verifies that a first end-mark does indeed exist at the next level up. *If at the first level, stage 620 verifies that the* value of the chaining vector C at address word$_i$ is "free word", i.e. that it has not yet been used, after which it gives it the value of the chaining indicator CI.

When not at the first level, stage 621 checks that the previously-established chaining at the first level is correct.

Stage 622 is then performed to increment chaining as shown in FIG. 4D. After which, stage 623 places the protection vector into the "access permitted" condition for the address word$_i$.

Thereafter, the processor delivers the "create-end-of-object" COMMAND. The procedure would have arrived directly at this stage if the object or sub-object being created was only one word long.

The memory responds thereto simply at 631 by passing said command to the STATE register.

At 632, the processor delivers the address of this last word.

The memory responds thereto by a FUNCTION 602 (see FIG. 6) referred to as the "create-end-of-object" function.

Stage 636 is the same as stage 616.

Stage 637 differs from stage 617 in that an end-of-object-end-mark is placed in vector E.

Stages 638 and 638A are identical to stages 618 and 618A.

If the last word is not also the first word, stage 639 simply places an end-of-object end-mark in vector E.

Figure 6:
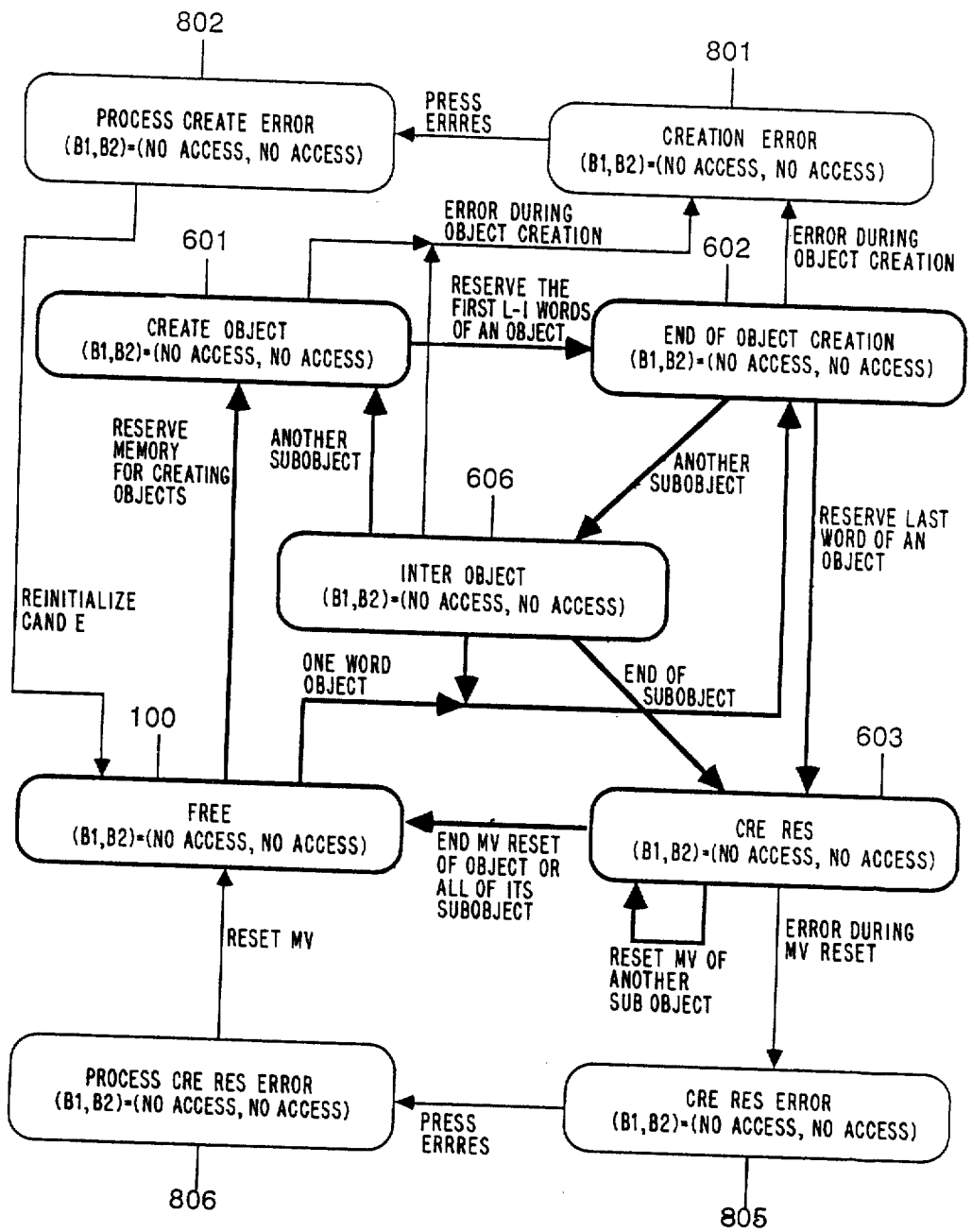
FIG. 6 is a state diagram relating to a "create-object" operation in accordance with the invention.
Figure 6A:
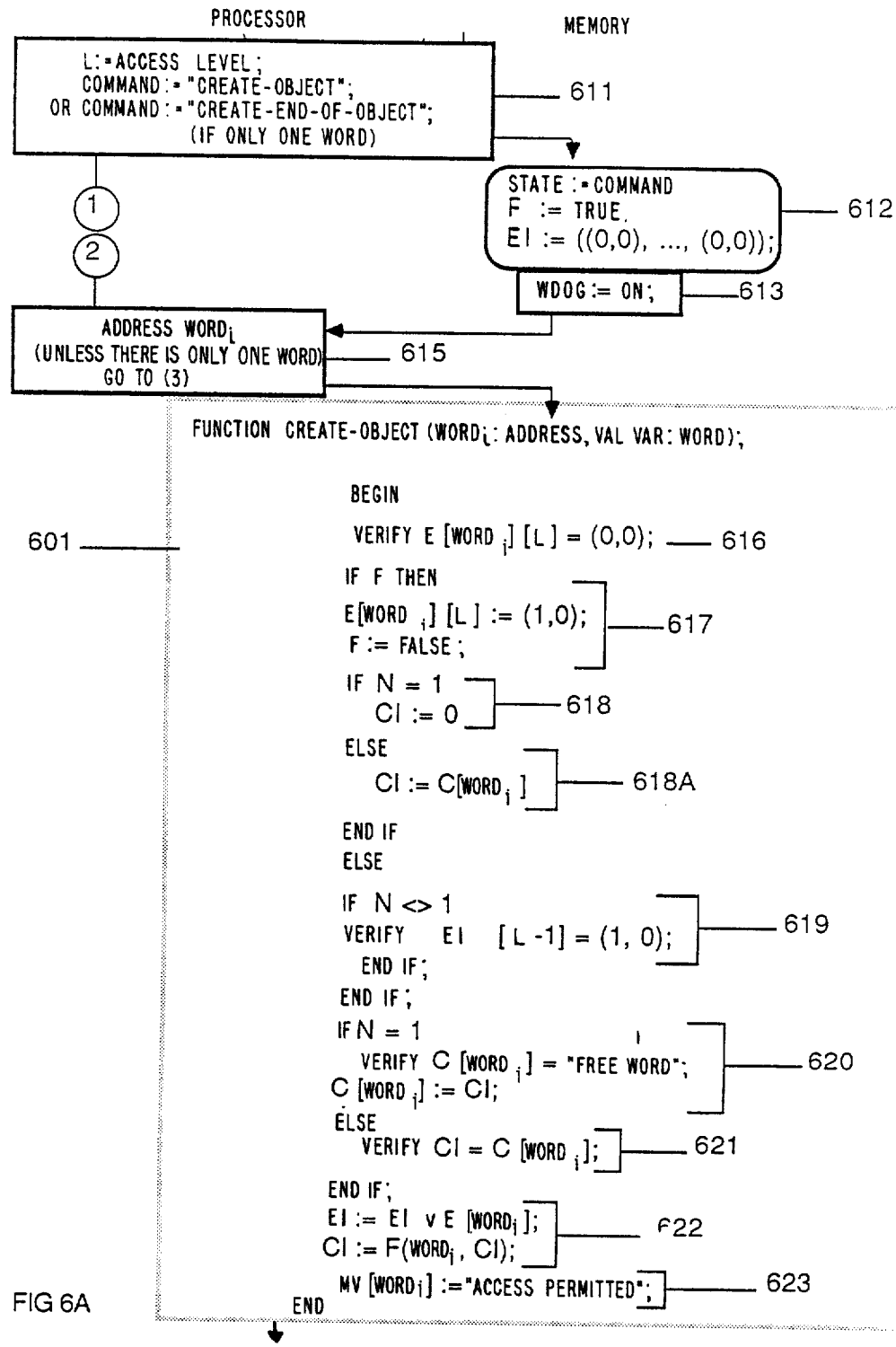
FIGS. 6A to 6D are an algorithm diagram showing a "create-object" stage in accordance with the invention.
Figure 6B:
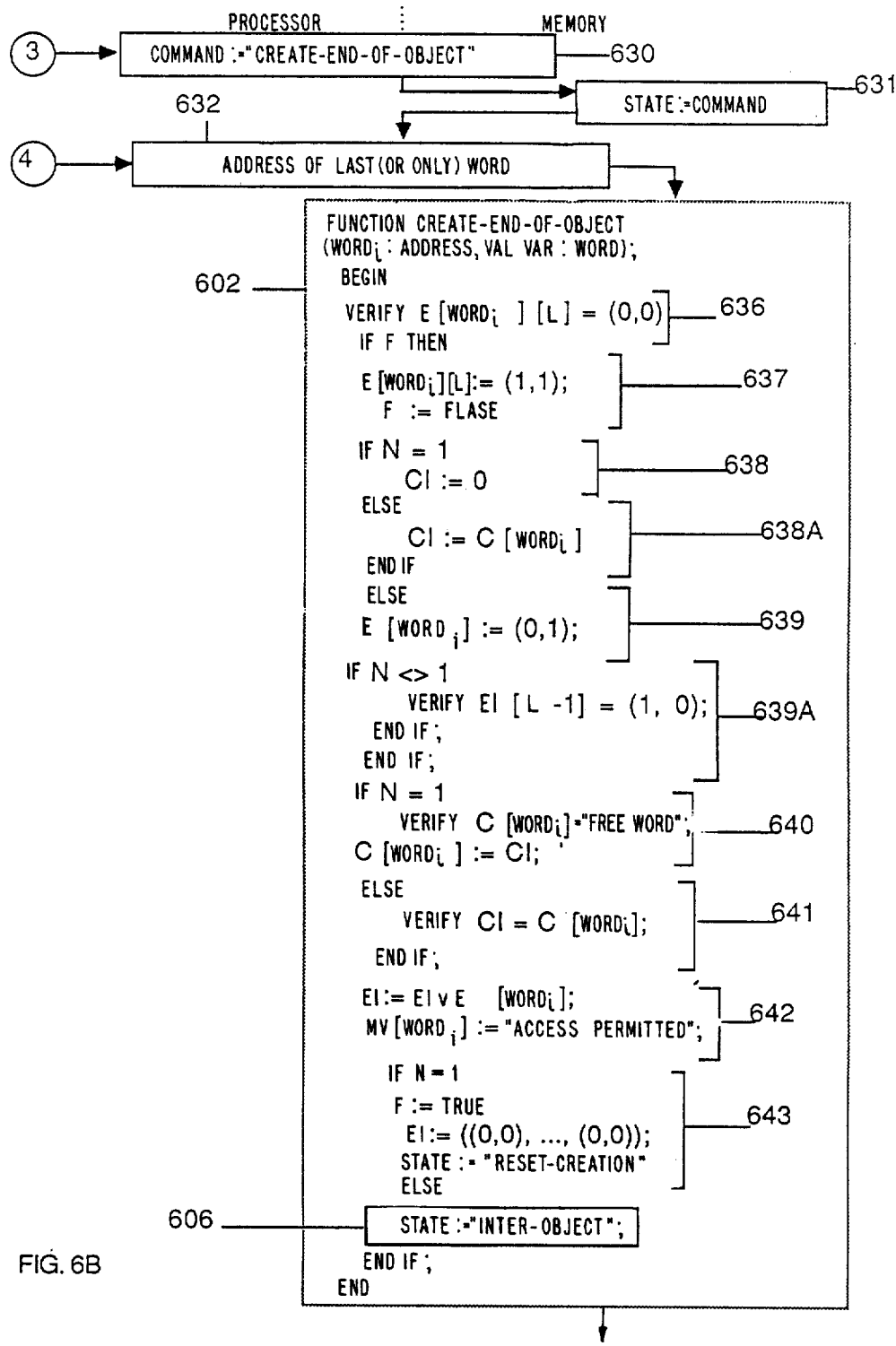
Figure 6C:
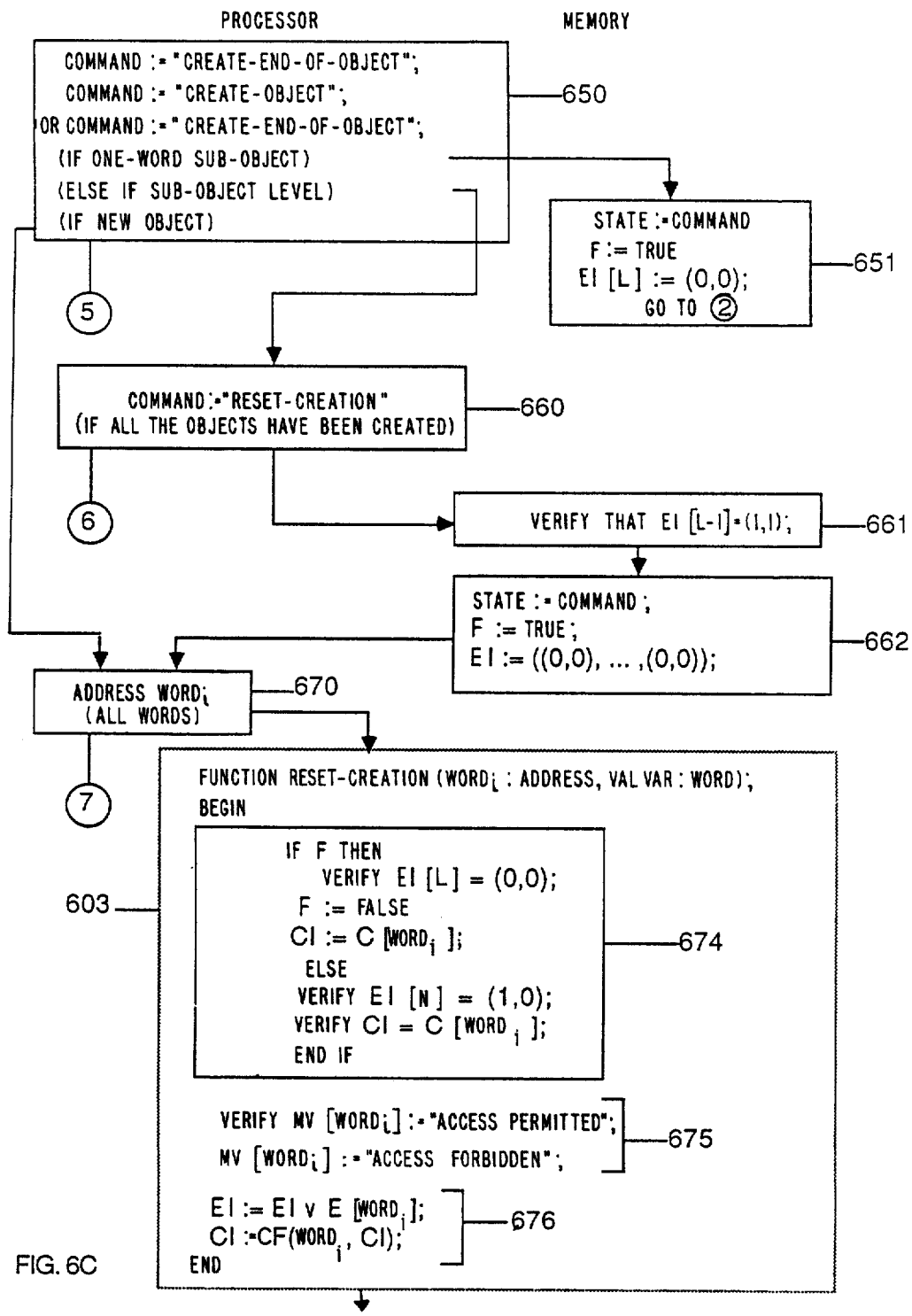
Figure 6D:
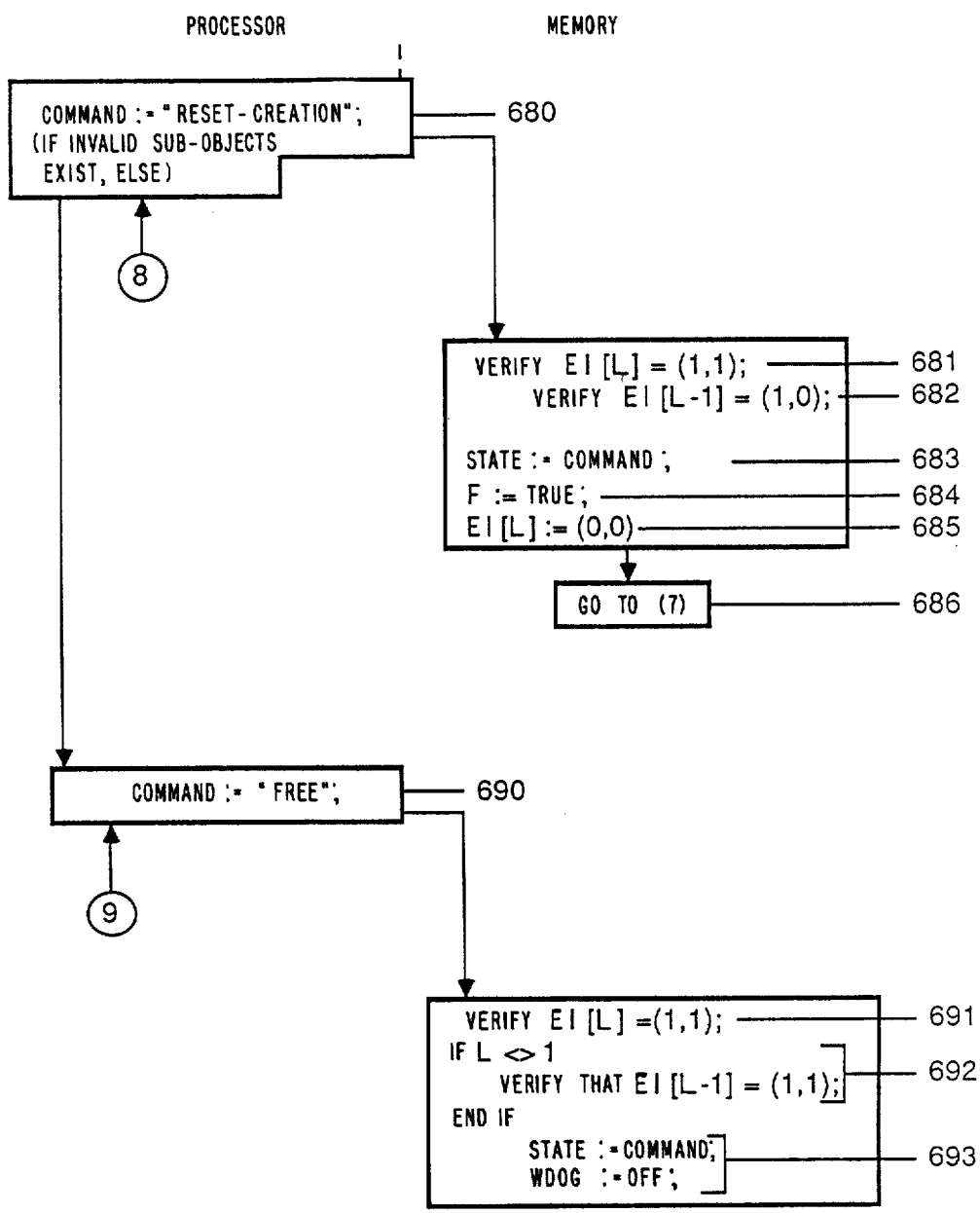

Stage 639A is identical to stage 619 of FIG. 6A.

Likewise, stage 640 is identical to stage 620, stage 641 to stage 621, and stage 642 corresponds to stages 622 and 623 taken together, with the chaining indicator updating step omitted, since this is pointless for a last word.

Thereafter, a stage 643 examines whether the first level is applicable, and whether the word is a first word or last word at the first level, in which case the current end-mark register EI is reset to zero, and the state "creation-reset" is established.

Otherwise, an inter-object (inter-sub-object) state is established at 606 which corresponds (see FIG. 6) to the case where the system is at a sub-object level and there remain further sub-objects to be defined. This state is a transient state and it is followed either by creating further sub-objects, or by transfer to "reset-creation".

The next action performed by the processor depends on various conditions. If there remain further sub-objects to be created, stage 650 defines the create-object or the create-end-of-object command (depending on whether or not the next sub-object is only one word long).

Thereafter, at 651 there is a phase which is close to the initialization after command stage shown in FIG. 4B, except that the last line resets only that portion of the register EI which corresponds to the current level L (where L is not equal to 1). Thereafter the system returns to (2), i.e. to stage 615.

If no further sub-objects remain to be created, there are two possible conditions:

either the system is at a sub-object level, in which case it passes to stage 660 or (6); or else the system is at object level, in which case the "reset-creation" state has already been established at 643 and the system passes to stage 670 or (7).

Stage 660 consists in establishing the "reset-creation" command for a sub-object.

At 661, the memory verifies that the last end mark of the higher level has indeed been reached, i.e. that the last sub-object of the current level has indeed been created.

After this, the system returns at 662 to initialization after command, as shown in FIG. 4B.

The processor now comes to stage 670 which could have been reached directly from 650.

The correctness of the object or sub-object structure created in the stable memory is now verified.

Thus, at 670 the processor presents the addresses word$_i$ of all of the words.

Each time, the memory responds by a "reset-creation" FUNCTION 603.

It begins at 674 by verifying chaining as shown in FIG. 4C.

Stage 675 then verifies that the marking vector MV is indeed in the "access permitted" position and is then immediately changed to the "access forbidden" condition.

Stage 676 is the increment chaining stage as shown in FIG. 4D.

At stage 680, the processor must now present the "reset-creation" command again, at least so long as there remain non-validated sub-objects. Otherwise, it is possible to pass directly to stage 690.

Stage 681 consists in verifying for the current sub-object that has been traversed from its first end-mark to its last end-mark. Stage 682 verifies that the first end-mark has been placed at the next level up, but does not concern the last end-mark.

Thereafter, stage 623 takes account of the command in the STATE register, stage 684 moves the F register to TRUE, stage 685 resets the register EI to the current address for the appropriate level L only. Thereafter, stage 686 returns to stage 670, i.e. to (7).

Finally, at 690, the processor provides the "free" COMMAND.

The memory responds thereto by verifying that the first and last end-marks have been placed for the current level at stage 691. If at a level other than the first level (i.e. the object level), the memory also verifies that the same is true for higher level(s), at stage 692.

Finally, at 693, the memory returns to the free state and releases the watchdog.

It should be observed that this "create-object" mode makes use of the marking vector MV, not for actually writing in the memory, but simply for marking the memory locations for which object or sub-object creation has taken place, and for subsequently verifying that said creation is homogeneous, after which the marks are deleted.

The delet-object mechanism is considerably simpler and is described with reference to FIG. 7.

It is comparable to the first two stages of writing as described with reference to FIGS. 5A and 5B, and to which further reference is now made.

This mechanism comprises a read-delete stage 701 comparable to the read-updating stage 501, and a delete stage per se 702 comparable to the write-updating stage 502.

Apart from the fact that the command is "read-delete", the only difference with read-update lies in that the initialization after command stage 512 is preceded by a verification that L=1, i.e. that the system is at the first level, since it is currently considered preferable to prevent sub-objects from being deleted independently.

The read-delete FUNCTION is itself identical to the read-update FUNCTION 501 (see FIG. 5A).

Thereafter the system moves directly to a "delete" COMMAND which replaces the "write-update" command 520.

This is followed by a "delete" FUNCTION which begins by verifying chaining as at 524 for the write-update FUNCTION.

Then, after verifying that the marking vector MV is in the "access permitted" condition (equivalent to stage 525), the marking vector is immediately changed to the "access forbidden" condition.

The write stage 526 is naturally omitted, and the system passes directly to the increment chaining stage 527.

Two new stages are now inserted, with the first new stage consisting in deleting the end-marks contained in the vector memory E at address word$_i$, and the second new stage consists in setting the chaining vector C at address word$_i$ to "word free".

Thereafter, the processor sets: command="free" and the system terminates as in FIG. 5B or FIG. 4A.

Various auxiliary mechanisms as shown in FIGS. 4, 5, 6, and 7 are now described.

The first is memory initialization as illustrated at 480 in FIG. 4.

It simply consists for each word address of index i:
in setting the marking vector MV to "access forbidden";
in setting the chaining vector C to "word free"; and
in setting all the pairs in the end-mark vector E at this address to "0".

The processor then sets: command="free" as before. This final stage is not described below.

If an error occurs during this procedure, the system passes to fatal error at 150.

An error due to the mechanism may occur during reading 400 per se. This is different from obtaining two non-matching reads from the two banks, and it gives rise to a fatal error 150.

If there is merely a mechanism error, the user (i.e. a physical person) can press an ERRRES push-button or a similar command may be transmitted by the processor in order to return directly to the free state 100.

In FIG. 5, an error may occur during the read updating stage 501. This causes the system to go to an opening error state referenced 570 from which no further access can be obtained in memory banks B1 and B2. Pressing ERRRES moves to state 571 for processing the opening error.

Such processing is very simple, since all that is required is for all words of address word$_i$ in the memory to be scanned, and for the marking vector MV of each of them to be set to "access forbidden".

The system then returns to the free state unless an error occurs during stage 571, in which case it passes to the fatal error state 150 (shown twice over in FIG. 5 in order to clarify the connections).

If an error takes place during the write-updating stage 502, or during the rapid updating stage 505, the system moves to the write error state 573 for bank 1, which is a transient state during which both banks are not accessible.

Pressing ERRRES returns to error processing 574.

Once again the processor runs through all memory words.

For each address word$_i$, the processor does nothing if the marking vector MV is in the "access forbidden" condition; otherwise, it causes the word contained at the current address in B2 to be written into B1. Thereafter, the marking vector MV is returned to the "access forbidden" condition for the address word$_i$.

Similarly, an error state 576 may occur during copy updating 503.

Again, after pressing ERRRES, the system passes to copy error processing 577. The processing is the same as for state 574, except that in this case B1 is copied into B2 at each address word$_i$ for which the marking vector MV is in the "access permitted" condition.

Reference is now made to FIG. 6 for errors which may occur while creating objects.

If this happens during states 601 or 602 shown in FIG. 6, it may be observed that only those words for which the marking vector MV was in the "access permitted" condition has been subjected to modification of the corresponding end mark vector E and chaining vector C.

In either case, the system moves to a creation error state 801, followed by a state 802 for processing a creation error. In both of these states, access to banks B1 and B2 is forbidden.

The processing of a creation error may be functionally described as follows. All of the memory words are scanned. At each address word$_i$:
if the protection vector is in the "access forbidden" condition for this address, nothing is done;
otherwise, if at the first level, the chaining vector C is set to "word free" for the address word$_i$;
if the marking vector MV is in "access permitted" at any level, the end-mark vector E for the level concerned is reset to zero, which may be written:

$$E(word_i)(L)=(0.0)$$

after which the marking vector MV is reset to "access forbidden" for address word$_i$ and so on.

If an error occurs during the inter-object state 606, the same error processing takes place via states 801 and 802.

There remains the verify-after-creation state, i.e. state 603 referenced CRE RES.

The system then goes to the CRERES ERROR state 805, followed after ERRRES has been pressed to corresponding error processing 806.

This processing consists simply in running through the words of the memory and in resetting the marking vector MV (word$_i$) to "access forbidden" each time it occurs in the "access permitted" condition. More simply, the entire marking vector memory MV may be reset to zero.

Figure 7:
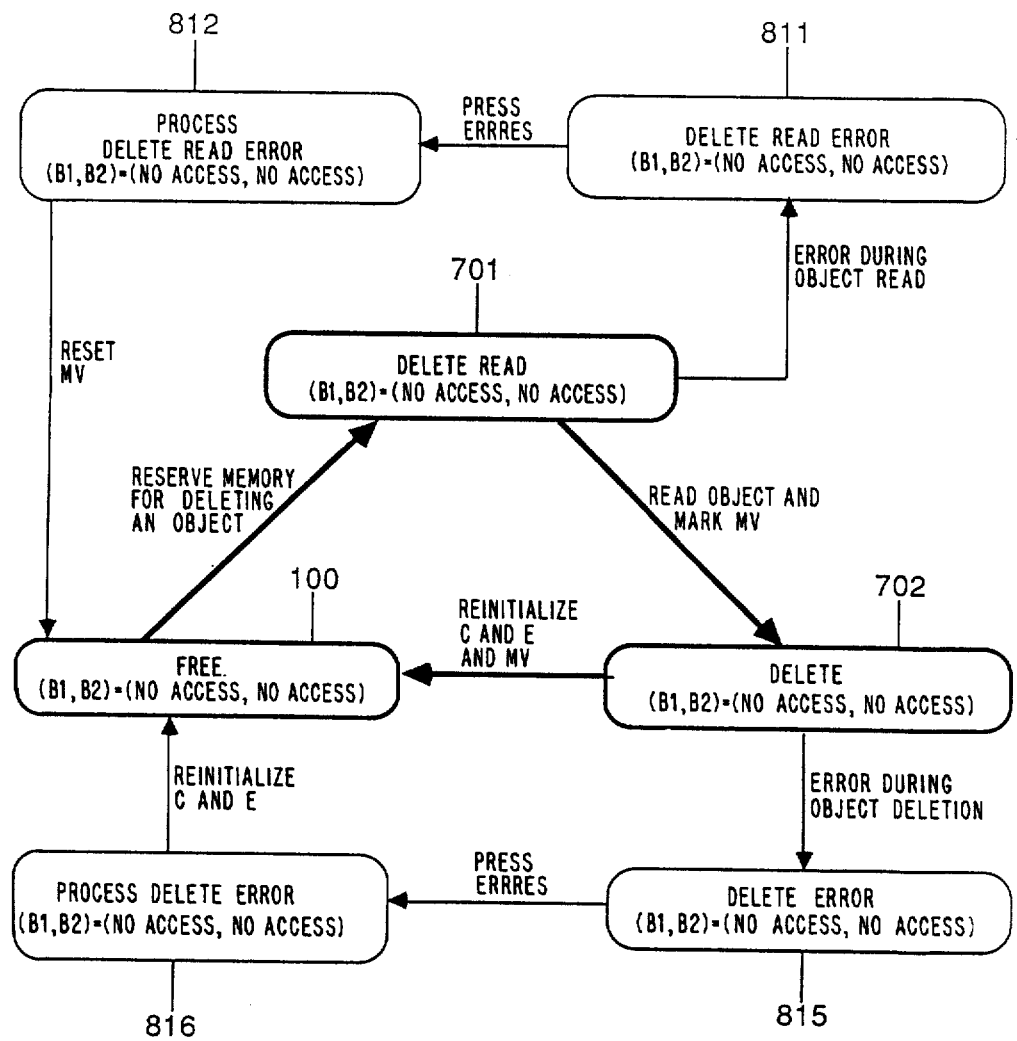
FIG. 7 is a state diagram relating to a "delete-object" operation in accordance with the invention.

Reference is now made to FIG. 7 for error processing.

Starting from the delete-read state 701, the system passes on error to state 811. After ERRRES has been pressed, the system proceeds to process the error in state 812. Here again, all that needs to be done is to reset the entire marking vector memory MV to the "access forbidden"' condition, i.e. to zero, and this may be done on an address-by-address basis or else in a single overall instruction, if the memory used is capable of being cleared globally in a single instruction.

An error may also occur during the delete state 702, which causes the system to move to a state 815 and then to an error processing state 816 after ERRRES has been pressed.

The resulting processing runs through all memory addresses word$_i$:
nothing is done is the marking vector MV (word$_i$) is in the "access forbidden" condition;

however, if it is in the "access permitted" condition, the chaining vector C (word$_i$) is set to "free"; the end mark vector E (word$_i$) is set to ((0,0), ..., (0.0)); thereby resetting all of the end-marks to zero; and finally the marking vector MV (word$_i$) is reset to "access forbidden".

It is also possible to provide an error condition relating to the free state (110 in FIG. 4). Error processing then consists solely in activating ERRRES, and then in returning to the free state.

There remains the processing applicable to a fatal error, which is completely different from that applicable to other errors.

It is recalled that there are two ways of arriving at a fatal error. The first occurs when reading gives rise to two different words in the two memory banks, which may be referred to as a non-matching read. The second is reached by an error which takes place during the processing of a normal error.

Since both memory banks are operated so that they overlap completely, i.e. so that they are addressed identically and synchronously, it is impossible to access them simultaneously. In a fatal error, two states are required for processing, i.e. for restarting in spite of the error, with each of these states allowing reading in one of the banks. Thereafter, in order to leave a fatal error, it must be possible to provide an overall reset to the stable memory card.

Here again, all addresses word$_i$ are presented by the processor which:

begins by reading bank B1 during state 151;
then reads bank B2 during state 152; and
then goes into standby mode with the possibility of making as many transitions as may be desired between states 151 and 152.

A user (a physical person) must then intervene in order to determine which version of the stored data is the good version. The user then presses the GENRES button.

In some cases, it is conceivable that the user processor is capable of detecting which version is good by performing software tests, and in this case it is the processor itself which will issue the general reset command.

The above description relates to a high-speed stable memory which is operated using a highly variable object and sub-object structure.

Naturally, the same memory could be operated using stable zones of fixed size. This could be done, for example, by placing a switch on the card. Errors would be processed in the same way as for normal mode operation.

The read mechanisms are considerably simplified since, with reference to FIG. 4A, the last two lines of stage 411 are removed, as is the entire stage 414, the entire stage 416, and the first line of stage 418.

Writing takes place on the basis of the rapid updating mechanism. The procedure is then very simple:

the command is transformed into a state and the watchdog is initialized;

the marking vector MV is put into "access permitted" and the word presented by the microprocessor is written into bank B1 at address word$_i$ (repetitively);

the system then passes to the simplified copy-updating command under the control of a transfer into the STATE register;

each word in bank B1 is copied into bank B2 and the marking vector MV is returned to the "access forbidden" configuration, for each address word$_i$ (repetitively); and the free command is performed and the watchdog is disabled.

Various improvements to the circuit in accordance with the invention are now described.

The first improvement relates to the possibility of objects being authenticated during updating (normal or rapid updating). This is implemented by comparing the first word of each object with a key stored in an authentic KEY register. Authentification is performed if an authentic KEY register is set true (the value to be determined). Otherwise the updating algorithms remain the same. The authentic KEY register is accessible for writing solely during the FREE state.

To this end, the block 414 (see FIG. 4C) is modified as follows:
before "else", insert:
  if AUTHENT=true then (optional key verification)
   verify that B1(word$_i$)=B2(word$_i$)=AUTHENTIC KEY
  endif This modification is particularly applicable for the "read-update" and "raid-update" functions (see block 515).

A second improvement consists in adding primitives for updating groups of objects (rapid updating, or updating with pre-read). During the first stage of updating, the objects are marked and counted. During the subsequent stages, the number of objects are recounted to verify that all the objects have been modified.

Further, the access level of each object may be different from that of the other objects. This requires a new table LB to be created for storing the access levels of each object. During a first updating stage, the elements of LB corresponding to the first words of the objects are marked with the current access level L. During the subsequent stages this level is verified.

Two counters NOBLU and NOBECR are thus added which respectively count up and count down the number of objects, together with a table LB having the same size as the memory. The mechanism used is described below for updating with pre-read (previously referred to as "read-update").

(1) The processor writes:
  L := access level;
  COMMAND := "group read";

The memory executes:
  STATE := COMMAND;
  F := true;
  EI := ((0,0), ..., (0,0));
  NOBLU := 0;
  WDOG := on;

The access rights are (B1, B2)=(read, read).

(2) The processor reads all of the words of the previous version of the object. After each access the memory executes:

```
function read_group (word$_i$: Address, val var : word);
 begin
  if F then                        {verify the invariant}
   verify EI[L] = (0,0);           {not first, not last}
   F := false;
   if AUTHENT = true then          {verify key, if any}
    verify B1[word$_i$] = B2[word$_i$] = AUTHENT_KEY
   endif
```

-continued

```
    BL[word_i] := L;                    {store level}
    CI := C[word_i];                    {initialize chaining}
  else
    verify EI[L] = (1,0)                {first, not last}
    verify CI = C[word_i];              {verify chaining}
  endif;
  val :=
    if (B1[word_i] = B2[word_i])
      then B1[word_i]
    else STATE := "fatal error";
    endif
  MV[word_i] := "access permitted"      {initialize MV}
  EI := EIvE[word_i];
  CI := CF(word_i, CI);
  end
```

(3) The processor writes: COMMAND := "inter_read_group"

The memory executes:
  verify EI[L]=(1,1);
  NOBLU := NOBLU+1;
  Authorize writing in L for this state;
  STATE := COMMAND;

The access rights are (B1, B2)=(no access, no access).
If there is another object to read go to 4, else go to 5.

(4) The processor writes:
  L := access level;
  COMMAND := "read_group"

The memory executes:
  STATE := COMMAND;
  F := true;
  EI := ((0,0), . . . , (0,0));

The access rights are (B1, B2)=(read, read).

(5) The processor writes:
  L := access level;
  COMMAND :="write_group";

The memory executes:
  STATE :==COMMAND;
  F := true;
  EI := (0,0, . . . , (0,0));
  NOBECR := NOBLU;

The access rights are (B1, B2)=(write, no access).

(6) The processor writes all of the words of the new version of the object. On each access the memory executes:

```
function write_group (word_i : Address, val : word);
begin
  if F then                             {verify invariant}
    verify EI[L] = (0,0)                {not first, not last}
    F := false;
    verify BL[word_i] = L;              {verify access level}
    CI := C[word_i];                    {initialize chaining}
  else
    verify EI0L] = (1,0);               {first, not last}
    verify CI = C[word_i];              {verify chaining}
  endif;
  verify MV[word_i] = "access permitted";
  B1[word_i] := val;
  EI := EIvE[word_i];
  CI := CF(word_i,CI);
```

(7) The processor writes: COMMAND := "inter_write_group".

The memory executes:
  verify EI[L] = (1,1);
  STATE := COMMAND;
  Authorize writing in L for this state;
  NOBECR := NOBECR−1;

The access rights are (B1, B2)=(no access, no access).

If there is another object to be written go to 8, else go to 9.

(8) The processor writes:
  L := access level;
  COMMAND := "write_group".

The memory executes:
  verify NOBECR <> 0;
  STATE := COMMAND;
  F := true;
  EI := ((0,0), . . . , (0,0);

The access rights are (B1, B2)=(write, no access).

(9) The processor writes:
  L := access level;
  COMMAND := "copy_group";

The memory executes:
  verify NOBECR = 0;
  NOBECR := NOBLU;
  STATE := COMMAND;
  F := true;
  EI := ((0,0), . . . , (0,0));

The access rights are (B1, B2)=(read, write).

(10) The processor rewrites all of the words of the new version of the object.

On each access the memory executes:

```
function copy_group (word_i : Address, val : word);
begin
  if F then                             {verify invariant}
    verify EI[L] = (0,0)                {not first, not last}
    F := false;
    verify BL[word_i] = L;              {verify access level}
    CI := C[word_i];                    {initialize chaining}
  else
    verify EI0L] = (1,0);               {first, not last}
    verify CI = C[word_i];              {verify chaining}
  endif;
  B2[word_i] := B1[word_i];             {local object copy}
  EI := EIvE[word_i];
  CI := CF(word_i,CI);
  verify MV[word_i] = "access permitted";
  MV[word_i] := "access forbidden";     {reset MV}
  end
```

(11) The processor writes: COMMAND := "inter_copy_group".

The memory executes:

verify EI[L]:= (1,1);
STATE := COMMAND;
NOBECR := NOBECR−1;
Authorize writing in L for this state;
The access rights are (B1, B2)=(no access, no access).

If there is another object to be written go to 12, else go to 13.

(12) The processor writes:
L := access level;
COMMAND := "copy−group".

The memory executes:
verify NOBECR <> 0;
STATE := COMMAND;
F := true;
EI := ((0,0, . . . , (0,0));

The access rights are (B1, B2)=(read, write).

(13) The processor writes:
COMMAND := "free";

The memory executes:
verify NOBECR := 0;
STATE := COMMAND;
WDOF := off;

The access rights are (B1, B2)=(no access, no access).

A rapid updating mechanism is naturally provided for groups of objects (without pre-read). Compared with the above mechanism, the rapid mechanism has the same simplification as before, when passing from "read-updating" to "rapid updating". In outline:
the first command, referred to as "rapid-group" gives the following access rights:
(B1, B2)=(write, no access)
and all the words of the new version of the object are written into B1;
the second command "inter-rapid-group" is constructed as the "inter-read-group" command, except that writing may follow in B1 together with the corresponding access rights; and
a third "copy-group" command is the same as before.

For the above two mechanisms, the associated error states and error-recovery states are the same as for updating an object.

APPENDIX A1

| CODE EXECUTED BY THE PROCESSOR 1 | CHECKS PERFORMED BY THE FILTER 20 |
|---|---|
| COMMAND = "read-update" | If the (free,read-update) transition is valid, then STATE = COMMAND |
| for each word in the object do REG = MEM (addr) done | On each filter access verify MV(addr) = PWD and generate the read function |
| COMMAND = "write-update" | If (read-update,write-update) transition is valid, then STATE = COMMAND |
| for each word in the object do REG = MEM (addr) done | On each filter access verify MV(addr) = PWD and generate the bank 1 write function |
| COMMAND = "copy-update" | If (write-update,copy-update) transition is valid, then STATE = COMMAND |
| for each word in the object | On each filter access verify |

APPENDIX A1-continued

| CODE EXECUTED BY THE PROCESSOR 1 | CHECKS PERFORMED BY THE FILTER 20 |
|---|---|
| do REG = MEM (addr) done | MV(addr) = PWD and generate the bank 1 to bank 2 copy function |
| COMMAND = "free" | If the (copy-update,free) transition is valid, then STATE = COMMAND |

APPENDIX A2

| STATE | B1 ACCESS | B2 ACCESS |
|---|---|---|
| FREE | NO ACCESS | NO ACCESS |
| READ | READ | READ |
| READ-UPDATE | READ | READ |
| WRITE-UPDATE | WRITE | NO ACCESS |
| COPY-UPDATE | READ | WRITE |
| RAPID-UPDATE | WRITE | NO ACCESS |
| CREATE-OBJECT | NO ACCESS | NO ACCESS |
| CREATE-END-OF-OBJECT | NO ACCESS | NO ACCESS |
| RESET CREATION | NO ACCESS | NO ACCESS |
| DELETE-READ | READ | READ |
| DELETE | NO ACCESS | NO ACCESS |
| ERRORS | NO ACCESS | NO ACCESS |
| PROCESS READ-UPDATE ERROR | NO ACCESS | NO ACCESS |
| PROCESS WRITE-UPDATE ERROR | WRITE | READ |
| PROCESS COPY-UPDATE ERROR | READ | WRITE |
| PROCESS CREATE ERROR | NO ACCESS | NO ACCESS |
| PROCESS RESET CREATE ERROR | NO ACCESS | NO ACCESS |
| PROCESS DELETE READ ERROR | NO ACCESS | NO ACCESS |
| PROCESS DELETE ERROR | NO ACCESS | NO ACCESS |
| PROCESS FATAL ERROR-1 | READ | NO ACCESS |
| PROCESS FATAL ERROR-2 | NO ACCESS | READ |

APPENDIX A3

| | TRUTH TABLE FOR v FOR ONE LEVEL | | | |
|---|---|---|---|---|
| v | 0,0 | 0,1 | 1,0 | 1,1 |
| 0,0 | ERROR | ERROR | 1,0 | 1,1 |
| 0,1 | ERROR | ERROR | ERROR | ERROR |
| 1,0 | 1,0 | 1,1 | ERROR | ERROR |
| 1,1 | ERROR | ERROR | ERROR | ERROR |

We claim:

1. A high-speed stable memory-type electronic circuit, comprising:
interface means having an address interface, a data input/output interface, and a write and read command interface for connection to an external processor;
first and second memory assemblies, each of the assemblies being independent non-volatile read/write memory assemblies having address inputs, read/write control inputs, and data inputs/outputs;
access control means connected firstly to an address interface and to a write and read instruction interface, and secondly to the address inputs and to the read/write control inputs of the first and second memory assemblies in order to establish access authorization only to a designated portion of the first and second memory assemblies on each occasion that a designated read or write operation is to be performed, said access authorization being destroyed after said memory portion has been addressed;
the access control means comprising a logic controller and a first non-volatile auxiliary memory containing partitioning information suitable for splitting each of the memory assemblies identically into at least one level of disjoint sub-assemblies, referred to as "objects" and wherein the logic controller splits each request for access to the memory from the external processor into one or more active access states, in each of which it verifies that a sequence of addresses applied to a memory assembly covers a complete subassembly (or object) as defined by the partitioning information, with any anomaly giving rise to the logic controller moving to an error state.

2. A circuit according to claim 1, comprising a switching member having;

means for generating a transfer state in which the switching member interconnects the inputs/outputs of the first memory assembly with the data input/output interface; and means for generating an interchange state in which the switching member interconnects the data inputs/outputs of the first and second memory assemblies; and wherein the logic controller has means for generating the following states:

a free state in which the logic controller is capable of receiving a write or read command from the external processor;

an active read state which is directly accessible from the free state in response to a read command;

an active write state for writing in one of the memory assemblies and in which the logic controller places the switching member into a transfer state;

an active copy state for copying one of the memory assemblies into the other, in which the logic controller places the switching member in an interchange state; and at least one error state;

and wherein execution of a write command from the external processor implies that the logic controller passes through the write state, and then the copy state, before returning to the free state.

3. A circuit according to claim 2, wherein the logic controller comprises a second non-volatile auxiliary memory, said second auxiliary memory constituting a marking vector having a size equal to a size of the memory assemblies and being addressed through the same address interfaces and access control means, and wherein each component thereof in its normal state prevents content-altering access to words in either of the first and second memory assemblies whose addresses are associated with said component, and wherein, in response to a write command from the external processor, the logic controller has means for activating the marking vector prior to writing in the first memory assembly selectively at a sequence of requested addresses, means for verifying the sequence of requested addresses against said partitioning information, and means for returning the marking vector to its normal state after copying the first memory assembly into the second memory assembly, with any anomaly giving rise to the logic controller passing into an error state.

4. A circuit according to claim 2, wherein the switching member further includes means for comparing respective data outputs of the first and second memory assemblies in order to indicate to the logic controller that they match.

5. A circuit according to claim 4, characterized in that the switching member, when in its comparison state, performs a prior verification on the respective data outputs from the first and second memory assemblies in order to detect any possible altered bits.

6. A circuit according to claim 4, comprising means for executing a write instruction wherein the means for executing a write instruction comprises means for passing through an active opening state ("read-updating") during which words constituting the subassembly to be written are scanned, and during which a marking vector for each of these words is changed, and wherein the switching member is put into the comparison state by the logic controller during said active opening state, thereby enabling contents and in particular coherence of the object to be verified by the processor prior to writing per se.

7. A circuit according to claim 4, wherein the logic controller has means for authorizing simultaneous reading of both memory assemblies during the read state, with the value read being validated only if the data outputs from both memory assemblies match.

8. A circuit according to claim 1, wherein the logic controller includes:

means for generating a further, "create-object" state for enabling the processor to define said partitioning information in conjunction with the logic controller; and means for generating a further "delete-object" state enabling existing partitions in the memory to be modified, and in particular enabling locations of objects which are no longer required to be eliminated.

9. A circuit according to claim 1, wherein the partitioning information contains chaining information between addresses of words in the memory assemblies, together with at least one set of pointers to the addresses of first and last words of each subassembly (object).

10. A circuit according to claim 9, wherein the partitioning information includes at least one further set of pointers for defining at least one further level of subassemblies (sub-objects) within each subassembly (object).

11. A circuit according to claim 9, wherein the chaining information, is coded, in particular in a form which takes account of how many "1" bits are used.

12. A circuit according to claim 11, comprising means for encoding the chaining information said means for encoding comprising means for summing a number of "1" bits in an address pointer for a preceding word and a number of "1" bits in a value of said preceding word.

13. A circuit according to claim 1, wherein the first auxiliary memory for the partitioning information comprises at least one vector memory which is addressed through the same address interface and access control means as the first and second memory assemblies.

14. A circuit according to claim 13, wherein the first auxiliary memory is a read/write memory.

15. A circuit according to claim 10, wherein the logic controller is associated with non-volatile read/write memory registers for addresses of words currently requested by the external processor, and for the chaining information and pointers relating to an address of a word previously requested by the external processor.

16. A circuit according to claim 1, including a command register in non-volatile read/write memory, said command register being an only part of the memory circuit capable of receiving either addresses or data from the external processor, from which it is directly addressable, and suitable for containing a current command, together with a level of access in the sub-assembly.

17. A circuit according to claim 16, also including non-volatile read/write memory registers connected to the logic controller for storing state information and level information copying contents of the command register, and for a binary flag representative of waiting for a first address to be applied to a memory after the state register has been activated.

18. A circuit according to claim 1, wherein the logic controller includes, at least:
 a write error state followed by copying contents of the second memory assembly into the first, for the object or sub-object portion concerned having a marking vector activated; and
 a copy error state followed by a copy repeat for copying the poriton of the object or the sub-object concerned whose marking vector is activated.

19. A circuit according to claim 6, wherein the logic controller includes, at least:
 a write error state followed by copying contents of the second memory assembly into the first, for the object or sub-object portion concerned having a marking vector activated; and
 a copy error state followed by a copy repeat for copying the portion of the object or the sub-object concerned whose marking vector is activated, and wherein the logic controller also has an opening error state followed by restoring the marking vector to its normal state.

20. A circuit according to claim 8, wherein the logic controller includes, at least:
 a write error state followed by copying contents of the second memory assembly into the first, for the object or sub-object portion concerned having its marking vector activated; and
 a copy error state followed by a copy repeat for copying the portion of the object or the sub-object concerned whose marking vector is activated, wherein the logic controller also has an opening error state followed by restoring the marking vector to its normal state, and
 wherein the logic controller also has a creation error state and a delete error state which are followed by cancelling the partitioning information relating to the portions of the object or sub-object concerned whose marking vector is activated.

21. A high-speed stable memory electronic circuit comprising:
 a first non-volatile read/write memory unit having first address inputs, first read/write control inputs and first data inputs/outputs,
 a second non-volatile read/write memory unit having second address inputs, second read/write control inputs and second data inputs/outputs,
 interface means comprising an address interface, a data input/output interface, a read/write command interface and being adapted for connection to an external processor and for receiving therefrom a request for access to a designated portion of said first and second memory units, said request for access including a designated read or write command, a sequence of addresses and a data word,
 access control means comprising a logic controller and a first auxiliary non-volatile memory,
 said first auxiliary non-volatile memory being adapted for containing partitioning information suitable for splitting each of said first and second memory units identically into at least one level of disjoint sub-units,
 said logic controller being connected firstly to said address interface and to said read/write command interface, and secondly to said first and second address inputs and to said first and second read/write control inputs,
 said logic controller having a normal condition and an error condition and being effective in its normal condition to verify that said sequence of addresses of said request for access covers a complete sub-unit, as defined by said partitioning information, and being responsive to an end of said request for access by validating said designated read/write command, if said designated portion of said first and second memory units have been addressed, said logic controller otherwise switching to an error state.

22. A circuit according to claim 21, comprising a switching member having means for generating:
 a transfer state in which reswitching member interconnects said first data inputs/outputs of said first memory unit with said data input/output interface; and
 an interchange state in which switching member interconnects said first data inputs/outputs of said first memory unit with said second data inputs/outputs of said second memory unit; and
 and wherein said normal condition of said logic controller comprises the following state:
 a free state in which said logic controller is capable of receiving said write or read command from the external processor;
 an active read state in which said logic controller is directly accessible from the free state in response to said read command;
 an active write state for writing in one of said first and second memory units and in which said logic controller places the switching member into the transfer state;
 an active copy state for copying one of said first and second memory units into the other of said first and second memory units in which said logic controller places the switching member in the interchange state;
 with execution of a write command from the external processor implying that the logic controller passes through the write state, and then the copy state, before returning to the free state.

* * * * *

UNITED STATES PATENT AND TRADEMARK OFFICE
CERTIFICATE OF CORRECTION

PATENT NO. : 4,799,186

DATED : January 17, 1989

INVENTOR(S) : Michel P. BANATRE et al.

It is certified that error appears in the above-identified patent and that said Letters Patent is hereby corrected as shown below:

The names and addresses of the first three inventors have been omitted from the front page of the patent. There are four joint inventors with Florimond E. Ployette being the last inventor. The first three inventors are as follows:

Michel P. Banatre, La Fresnais, France;

Jean-Pierre A. Banatre, La Fresnais, France;

Gilles M. Muller, Rennes, France.

On the title page, Item [19], "Ployette" should read -- Banatre et al. --.

Signed and Sealed this

Twelfth Day of December, 1989

*Attest:*

JEFFREY M. SAMUELS

*Attesting Officer*     *Acting Commissioner of Patents and Trademarks*